(12) United States Patent
Kita et al.

(10) Patent No.: US 8,498,413 B2
(45) Date of Patent: Jul. 30, 2013

(54) IMAGE PROCESSING DEVICE, IMAGE PROCESSING SYSTEM, PROGRAM PRODUCT THEREFOR, AND IMAGE PROCESSING METHOD

(75) Inventors: Hiromi Kita, Kanagawa (JP);
Masakatsu Kanda, Kanagawa (JP);
Tadaomi Suzuki, Kanagawa (JP);
Hiroshi Hayashi, Kanagawa (JP);
Tsutomu Kimura, Kanagawa (JP);
Takeshi Furuyama, Kanagawa (JP);
Shinji Hanaoka, Kanagawa (JP);
Shintaro Adachi, Kanagawa (JP); Kenji Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1439 days.

(21) Appl. No.: 11/812,347

(22) Filed: Jun. 18, 2007

(65) Prior Publication Data

US 2008/0104677 A1    May 1, 2008

(30) Foreign Application Priority Data

Oct. 31, 2006    (JP) ................................. 2006-295932

(51) Int. Cl.
*H04N 1/44* (2006.01)
(52) U.S. Cl.
USPC .......... 380/243; 399/365; 399/366; 358/1.18; 713/176
(58) Field of Classification Search
USPC .................................. 399/365, 366; 380/243
See application file for complete search history.

(56) References Cited

U.S. PATENT DOCUMENTS

| 5,771,101 | A  | * | 6/1998 | Bramall ......................... 358/405 |
| 6,519,770 | B2 | * | 2/2003 | Ford ............................... 725/28 |
| 6,978,112 | B2 | * | 12/2005 | Kaburagi et al. ............. 399/366 |
| 6,980,320 | B2 | * | 12/2005 | Ito ................................. 358/1.18 |
| 7,149,353 | B2 | * | 12/2006 | Siegel et al. .................. 382/190 |
| 7,197,644 | B2 | * | 3/2007 | Brewington .................. 713/176 |
| 7,263,328 | B2 | * | 8/2007 | Asai et al. ..................... 399/408 |

(Continued)

FOREIGN PATENT DOCUMENTS

| JP | A 2002-57895 | 2/2002 |
| JP | A 2004-032033 | 1/2004 |

OTHER PUBLICATIONS

Office Action issued in JP Application No. 2006-295932 on Nov. 30, 2010 (with English translation).

*Primary Examiner* — April Y Blair
(74) *Attorney, Agent, or Firm* — Oliff & Berridge, PLC

(57) ABSTRACT

An image processing device includes: an image obtaining unit that obtains original images one by one from an original document on which image processing is to be performed by the image processing device; an output unit that outputs each of the original images obtained by the image obtaining unit; an information acquiring unit that acquires control information for controlling operations to be performed by the image processing device, the control information being extracted from a control image represented by a specific image in the original image obtained by the image obtaining unit; and a control unit that determines whether the control information acquired by the information acquiring unit requires an authentication, determines whether an output of the original image having the control information is restricted on the basis of a result of the authentication when the control information requires an authentication, restricts the output of the original image when the output is determined to be restricted, and controls the output unit to output the original image when the original image does not require an authentication or when the output of the original image is determined not to be restricted.

13 Claims, 28 Drawing Sheets

U.S. PATENT DOCUMENTS

| | | | |
|---|---|---|---|
| 7,633,637 B2* | 12/2009 | Fujimoto | 358/1.14 |
| 7,761,908 B2* | 7/2010 | Yokoyama | 726/4 |
| 2005/0054342 A1* | 3/2005 | Otsuka | 455/426.2 |
| 2005/0098621 A1* | 5/2005 | de Sylva | 235/379 |
| 2005/0254070 A1* | 11/2005 | Sayama | 358/1.1 |
| 2007/0234400 A1* | 10/2007 | Yanagi | 726/1 |
| 2007/0245153 A1* | 10/2007 | Richtsmeier et al. | 713/186 |

* cited by examiner

CD1~4          INFORMATION CODES
AC1~4          CODE AREAS
AS1~4          SYNCHRONOUS CODE AREAS
CP01, 02, 03, 11, 12   RESTRICTION CODES
IP8            LATENT IMAGE

TBD IDENTIFYING INFORMATION TEXT BOX
BCD IDENTIFYING INFORMATION ENTER BUTTON

TP   PASSWORD TEXT BOX
BA   END BUTTON
BB   BLANK INSERTION BUTTON
BC   PASSWORD ENTER BUTTON
BF   FORM INSERTION BUTTON
BS   SKIP BUTTON

BY  YES BUTTON
BN  NO BUTTON

TP   PASSWORD TEXT BOX
BA   END BUTTON
BBC  BLACK IMAGE COMBINE BUTTON
BC   PASSWORD ENTER BUTTON
BFC  FORM COMBINE BUTTON
BS   SKIP BUTTON

IMAGE PROCESSING DEVICE, IMAGE PROCESSING SYSTEM, PROGRAM PRODUCT THEREFOR, AND IMAGE PROCESSING METHOD

CROSS-REFERENCE TO RELATED APPLICATIONS

This application is based on and claims priority under 35 USC 119 from Japanese Patent Application No. 2006-295932 filed Oct. 31, 2006.

BACKGROUND

1. Technical Field

The present invention relates to an image processing device, an image processing system, a program product therefor, and an image processing method.

2. Related Art

There have been image processing devices that perform image processing operations only when predetermined conditions are satisfied.

SUMMARY

According to an aspect of the invention, there is provided an image processing device including an image obtaining unit, an output unit, an information acquiring unit, and a control unit. The image obtaining unit obtains original images one by one from an original document on which image processing is to be performed by the image processing device. The output unit outputs each of the original images obtained by the image obtaining unit. The information acquiring unit acquires control information for controlling operations to be performed by the image processing device, the control information being extracted from a control image represented by a specific image in the original image obtained by the image obtaining unit. The control unit determines whether the control information acquired by the information acquiring unit requires an authentication, determines whether an output of the original image having the control information is restricted on the basis of a result of the authentication when the control information requires an authentication, restricts the output of the original image when the output is determined to be restricted, and controls the output unit to output the original image when the original image does not require an authentication or when the output of the original image is determined not to be restricted.

BRIEF DESCRIPTION OF THE DRAWINGS

Exemplary embodiments of the present invention will be described in detail based on the following figures, wherein.

DETAILED DESCRIPTION

The following is a description of exemplary embodiments of the present invention, with reference to the accompanying drawings.

First Exemplary Embodiment

Figure 1:
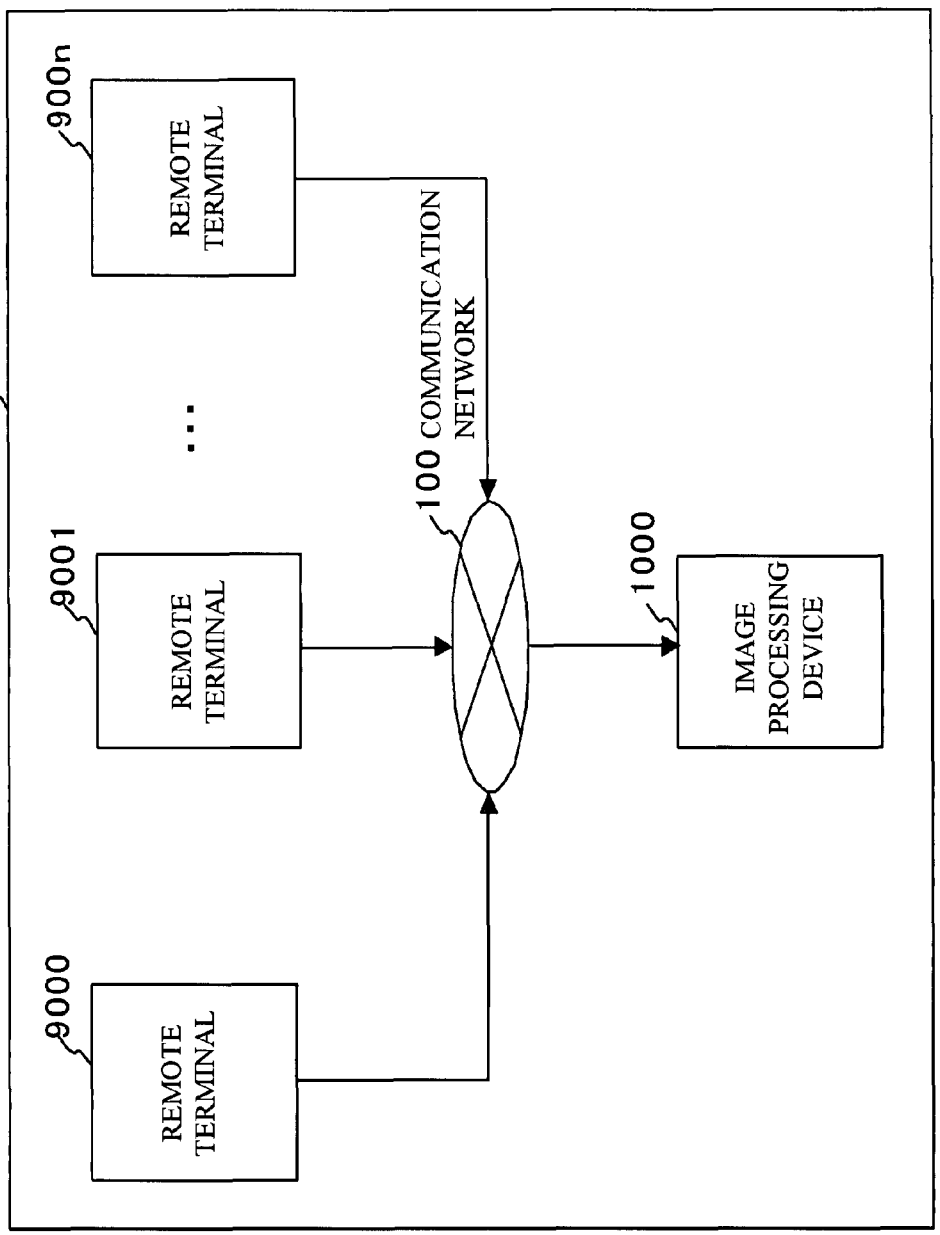
FIG. 1 illustrates the structure of one exemplary embodiment of an image processing system.

FIG. 1 illustrates the structure of one exemplary embodiment of an image processing system in accordance with the present invention.

The image processing system 10 of this exemplary embodiment includes a communication network 100, one or more remote terminals 9000 through 900n, and an image processing device 1000.

The communication network 100 may be a LAN (Local Area Network), a WAN (Wide Area Network), a MAN (Metropolitan Area Network), or a public line network, for example. The communication network 100 connects the image processing device 1000 to the remote terminals 9000 through 900n, so that the image processing device 1000 can communicate with the remote terminals 9000 through 900n.

The remote terminals 9000 through 900n are now described prior to an explanation of the image processing device 1000. Since the remote terminals 9000 through 900n have substantially the same structures, connections, and functions, only the remote terminal 9000 is described.

The remote terminal 9000 may be a personal computer or a PDA (Personal Digital Assistant), for example, and is connected to the image processing device 1000 via the communication network 100.

Although not shown in the drawings, the remote terminal 9000 includes an input unit formed with a keyboard, a pointing device, a touch panel, or buttons, a display unit formed with a liquid crystal panel or a CRT (Cathode Ray Tube), and a communication unit formed with a network adaptor or the like.

The input unit of the remote terminal 9000 is operated by a user who uses the remote terminal 9000 to input various kinds of information such as control information and various instructions. The communication unit of the remote terminal 9000 receives the input control information and various instructions, and transmits them to the image processing device 1000. The communication unit also receives information transmitted from the image processing device 1000. The received information is displayed on the display unit.

The image processing device 1000 is connected to the remote terminals 9000 through 900*n* via the communication network 100. The image processing device 1000 receives various kinds of information such as control information and various instructions from the remote terminals 9000 through 900*n*.

Figure 2:
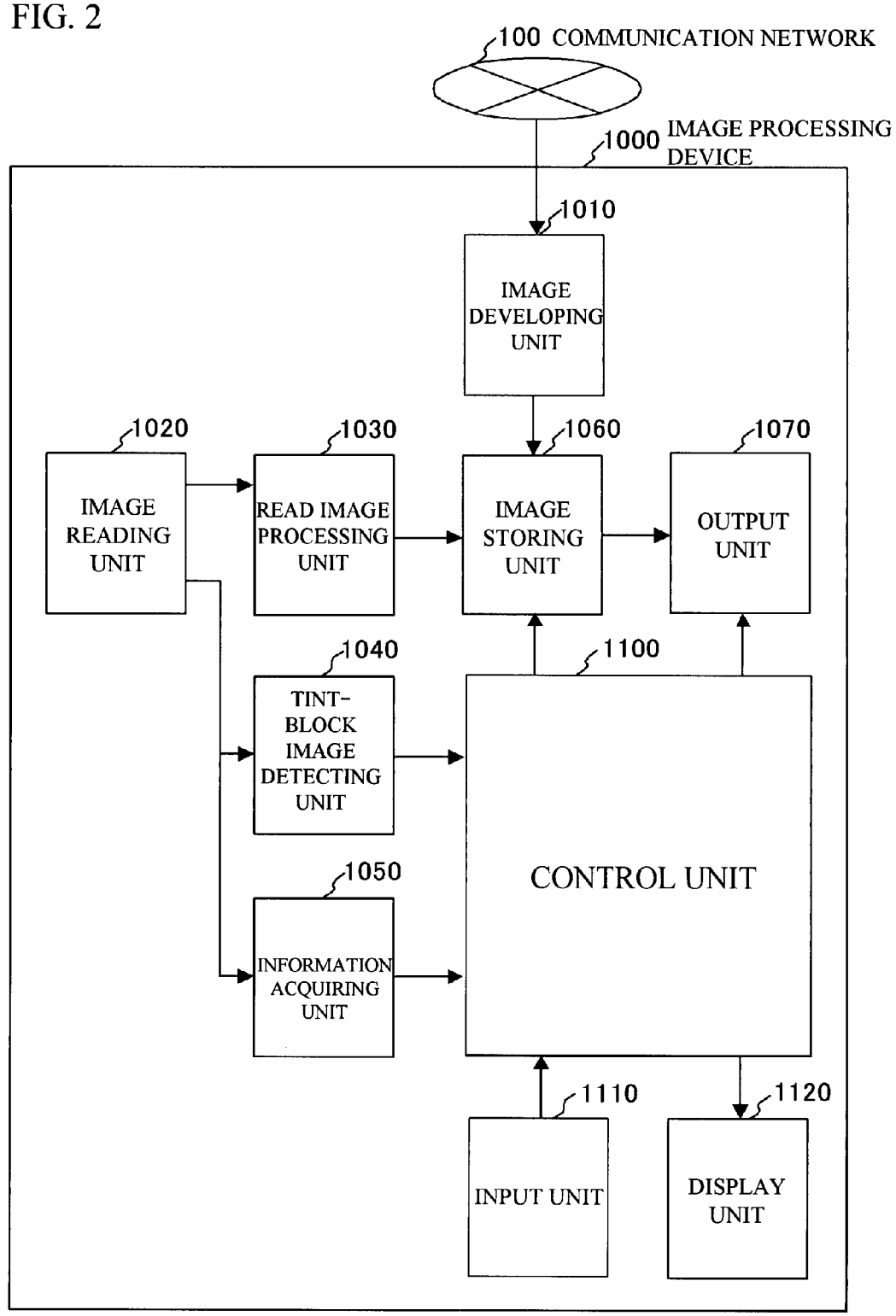
FIG. 2 is a functional block diagram of an image processing device in accordance with a first exemplary embodiment of the present invention.

Referring now to FIG. 2, the structure of the image processing device 1000 of this exemplary embodiment is described. FIG. 2 is a functional block diagram of the image processing device 1000 of the first exemplary embodiment.

The image processing device 1000 includes an image developing unit 1010, an image reading unit 1020, a read image processing unit 1030, a tint-block image detecting unit 1040, an information acquiring unit 1050, an image storing unit 1060, an output unit 1070, a control unit 1100, an input unit 1110, and a display unit 1120.

The respective functions of the image developing unit 1010, the image reading unit 1020, the read image processing unit 1030, the tint-block image detecting unit 1040, the information acquiring unit 1050, the image storing unit 1060, the output unit 1070, the control unit 1100, the input unit 1110, and the display unit 1120 are realized through software control performed by the image processing device 1000.

Figure 3:
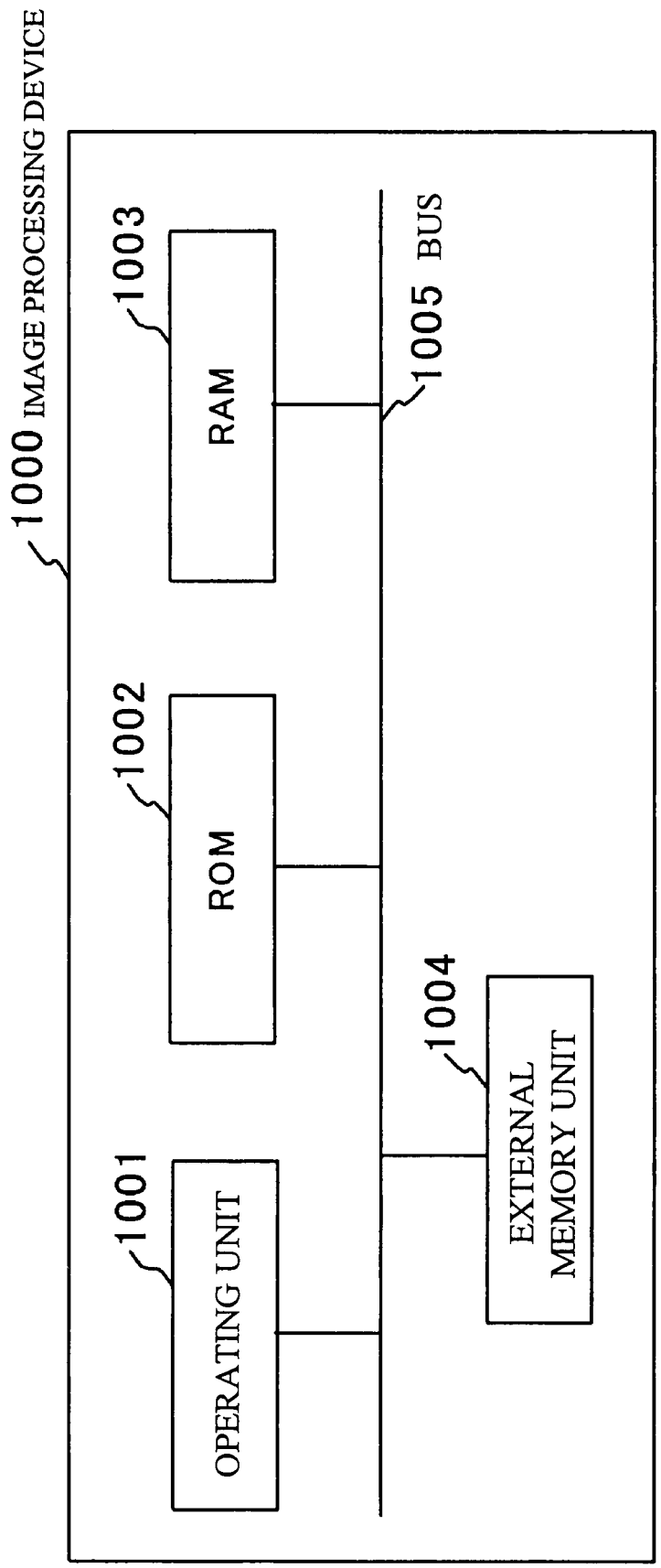
FIG. 3 illustrates the hardware structure of the image processing device.

Referring now to FIG. 3, the hardware structure of the image processing device 1000 that performs the software control is described. FIG. 3 illustrates an example hardware structure of the image processing device 1000 that performs the software control.

The image processing device 1000 includes: an operating unit 1001 such as a CPU (Central Processing Unit); a ROM (Read-Only Memory) 1002 such as an EPROM (Erasable Programmable Read-Only Memory) or an EEPROM (Electrically Erasable Programmable Read-Only Memory); a RAM (Random Access Memory) 1003 that is a semiconductor memory device (a volatile memory) such as a DRAM (Dynamic RAM) or a SRAM (Static RAM) that loses the memory contents when the power is switched off, or a semiconductor memory device (a nonvolatile memory) such as a NVRAM (Nonvolatile RAM) that does not lose the memory contents even when the power is switched off; and an external memory unit 1004 such as a hard disk. The operating unit 1001, the ROM 1002, the RAM 1003, and the external memory unit 1004 are connected to one another with a bus 1005.

The software control is performed when the operating unit 1001 reads a program stored in at least one of the ROM 1002, the RAM 1003, and the external memory unit 1004, and performs an operation in accordance with the read program. In this manner, the functions of the above-described components are realized.

Referring back to FIG. 2, the structure of the image processing device 1000 is further described.

The image developing unit 1010 is connected to the communication network 100 and the image storing unit 1060. The image developing unit 1010 receives information such as a page description language (PDL) from the communication network 100. Based on the information, the image developing unit 1010 develops an original image.

In this exemplary embodiment, the image developing unit 1010 is connected to the communication network 100, and develops an original image on the basis of information received from the communication network 100. However, the present invention is not limited to this arrangement.

The image developing unit 1010 may be connected to the external memory unit 1004 that is detachably connected to the image processing device 1000 with the bus 1005 compliant with the USB (Universal Serial Bus) or PCI (Peripheral Component Interconnect) standard, for example. The image developing unit 1010 may be designed to develop an original image on the basis of an electronic file that is obtained from the external memory unit 1004.

Particularly, the external memory unit 1004 and the image processing device 1000 can be connected to each other by a "hot docking" technique. Even when the image processing device 1000 is operating, the external memory unit 1004 can be attached to and detached from the image processing device 1000.

The image developing unit 1010 then outputs the developed original image to the image storing unit 1060 in accordance with the sequence in which the original document is formed (the page order of the pages carrying original images in the original document).

The image reading unit 1020 may be a scanner, for example, and is connected to the read image processing unit 1030, the tint-block image detecting unit 1040, and the information acquiring unit 1050. The image reading unit 1020 reads printing media such as printing paper sheets one by one in accordance with the sequence in which the original document to be duplicated is formed (or the order in which the printing media are stacked). In this manner, the image reading unit 1020 obtains the original images printed on the printing media. The image reading unit 1020 then outputs each of the obtained images to the read image processing unit 1030, the tint-block image detecting unit 1040, and the information acquiring unit 1050.

The read image processing unit 1030 is connected to the image reading unit 1020 and the image storing unit 1060. The read image processing unit 1030 obtains an image from the image reading unit 1020, and performs an image processing operation such as an image correction, a color conversion, or an enlarging or reducing operation. The read image processing unit 1030 outputs the processed image to the image storing unit 1060.

The tint-block image detecting unit 1040 is connected to the image reading unit 1020 and the control unit 1100. The tint-block image detecting unit 1040 obtains the image read by the image reading unit 1020.

The tint-block image detecting unit 1040 then detects a control image representing the control information from the obtained image. In this exemplary embodiment, a background tint-block image is used as the control image.

The tint-block image detecting unit 1040 then outputs a result of a determination made on whether the obtained image contains a background tint-block image, to the control unit 1100.

Figure 4:
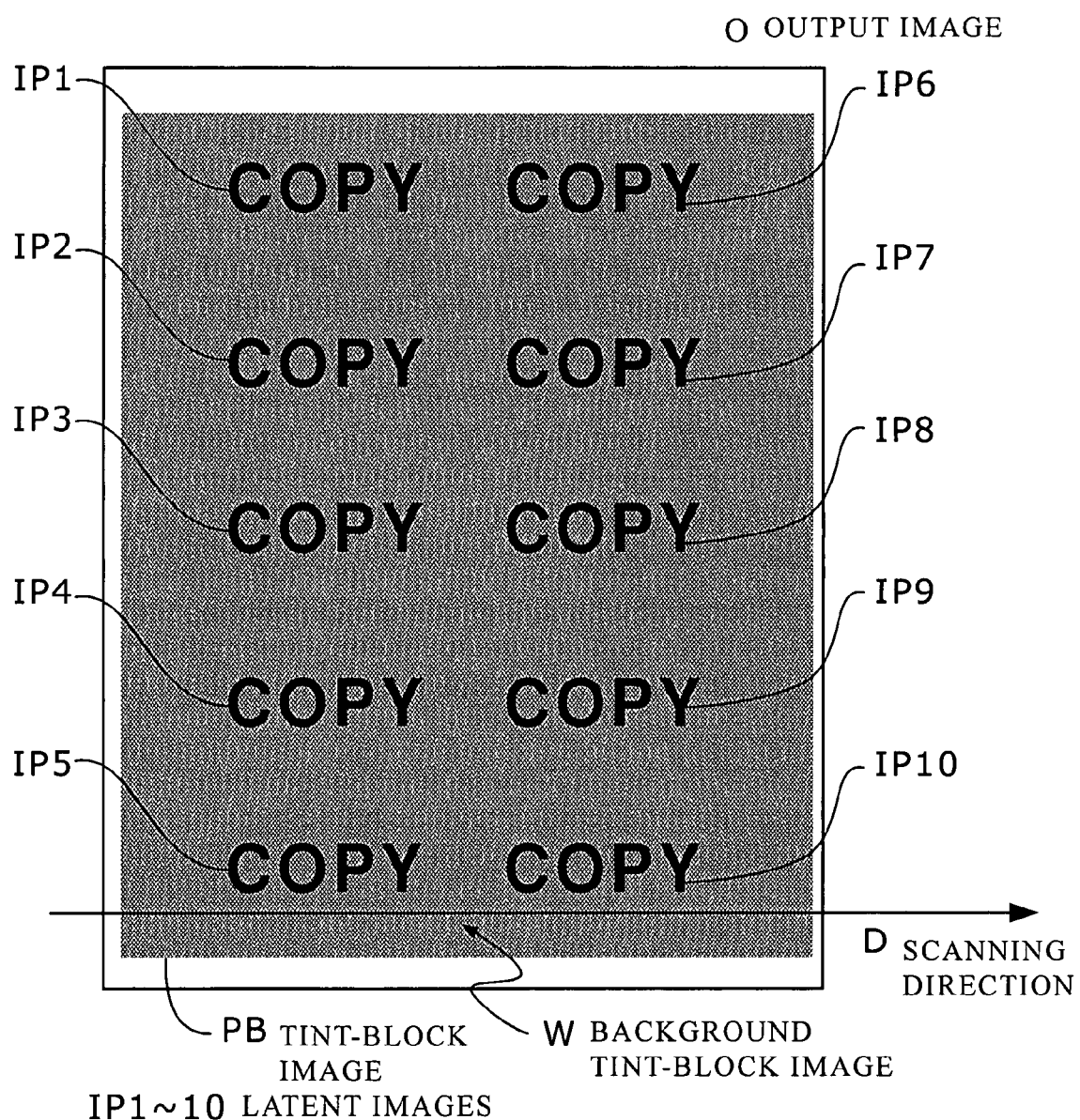
FIG. 4 shows an example of a background tint-block image.

Referring now to FIG. 4, a background tint-block image to be detected by the tint-block image detecting unit 1040 is described. FIG. 4 shows an example of a background tint-block image.

Here, a background tint-block image is formed with latent image portions and background portions. The background portions include a tint-block image PB formed with predetermined repetitive diagonal lines (hereinafter referred to simply as the predetermined lines). The latent image portions include images formed with predetermined repetitive dots that cannot be reproduced as a result of a copying operation. A background tint-block image W is to be combined with the background of an output image O to be printed out.

More specifically, the background tint-block image W is formed with latent images IP that are the latent image portions, and the tint-block image PB covering the entire area or at least a part of the area of the output image O, as shown in the output image O in FIG. 4.

The tint-block image PB and each of the latent images IP have different repetitive images from each other. However, the output image O is formed so that the pixel areas and the pixel colors of the respective unit areas are the same. With this arrangement, the background is gray to the human eye.

Each of the latent images IP is formed with smaller dots than the other latent images in the duplicated document, so that the latent images IP appear to pop up and can be recognized by the human eye.

Figure 5:
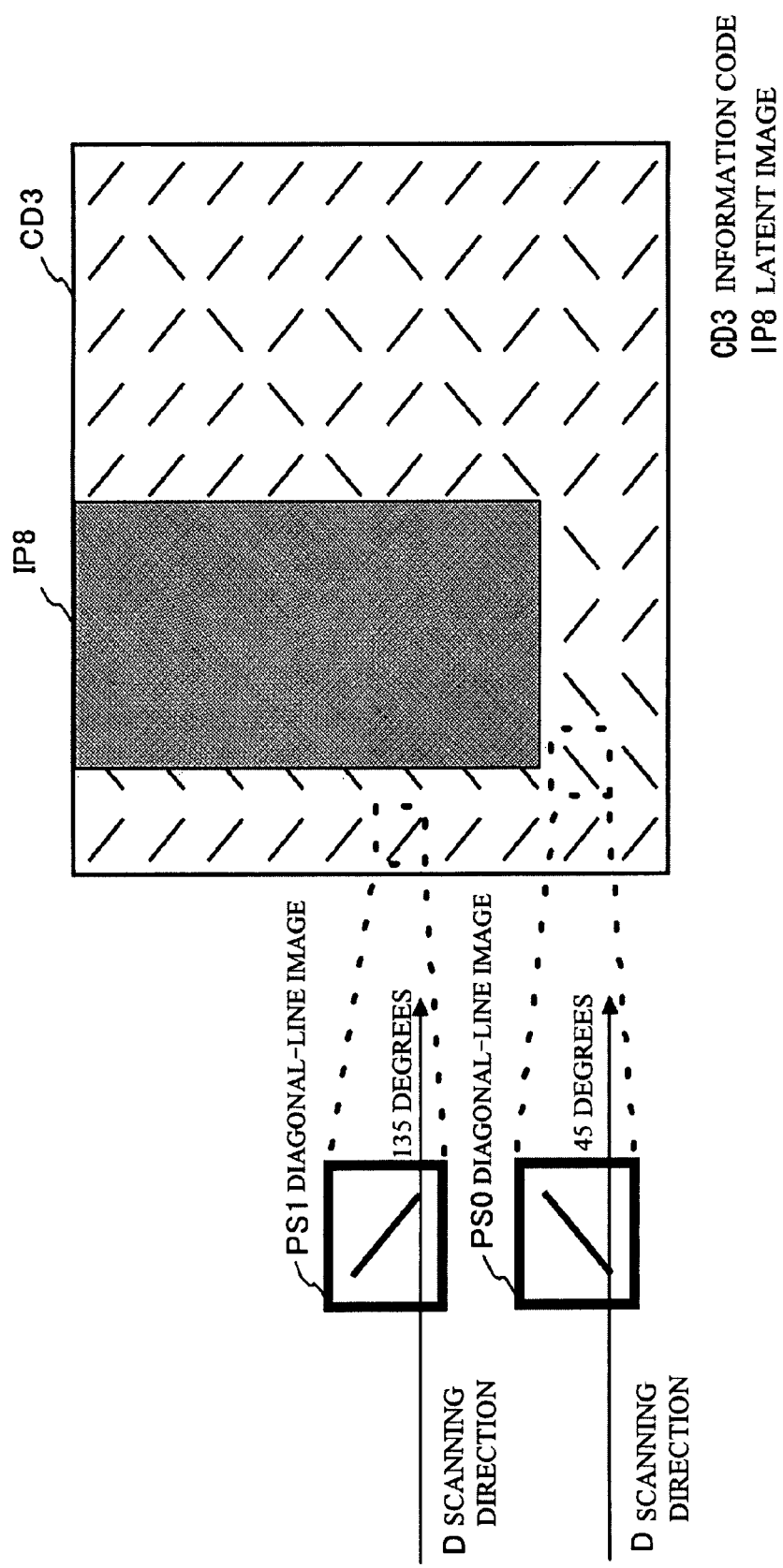
FIG. 5 shows an example of specific images that form codes.

The tint-block image PB is formed with codes and the codes are formed with predetermined repetitive images. Referring now to FIG. 5, the codes that form the tint-block image PB are described. FIG. 5 shows an example of the specific images that form the codes.

FIG. 5 is a partially enlarged view of the background tint-block image W shown in FIG. 4. The codes that form the background tint-block image W are formed with specific images PS that are diagonal lines. The diagonal-line images PS include lines tilted 45 degrees counterclockwise with respect to the scanning direction D, and lines tilted 135 degrees counterclockwise with respect to the scanning direction D. Each of the lines tilted 45 degrees represents "bit 0" as an information code CD, and each of the lines tilted 135 degrees represents "bit 1" as an information code CD.

The codes are also formed with information codes CD representing the information including the control information for controlling operations to be performed by the image processing device (hereinafter referred to simply as the code information), and restriction codes CP each indicating a need to perform an operation in accordance with the information codes CD.

Figure 6:
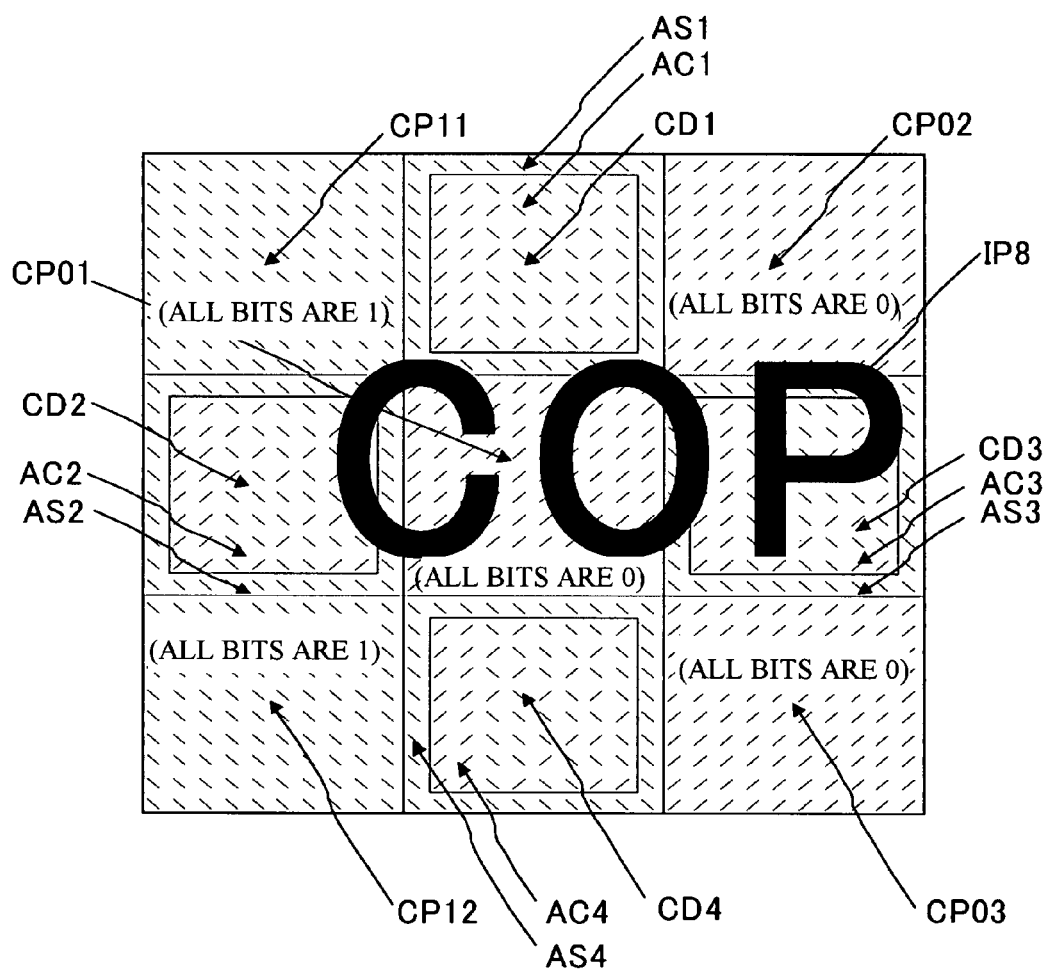
FIG. 6 shows an example of restriction codes.

Referring now to FIG. 6, the restriction codes CP are described. FIG. 6 shows an example of the restriction codes CP.

The restriction codes CP include restriction codes CP in which all the diagonal-line images PS represent "bit 0", and restriction codes CP in which all the diagonal-line images PS represent "bit 1". As will be described in later exemplary embodiments, a check is made to determine whether an image read into the image processing device contains the background tint-block image W, based on whether more than a predetermined number of restriction codes CP of the two kinds have been detected.

Each of the information codes CD is formed with a synchronous code area AS and a code area AC. The synchronous code area AS is the rectangular outer peripheral region of a predetermined size that surrounds the code area AC. All the diagonal-line images PS in the rectangular outer peripheral region are diagonal-line images PS1 each representing "bit 1". The code area AC represents the code information including the control information through a combination of diagonal-line images PS0 each representing "bit 0" and the diagonal-line images (specific images) PS1 each representing "bit 1".

Figure 7:
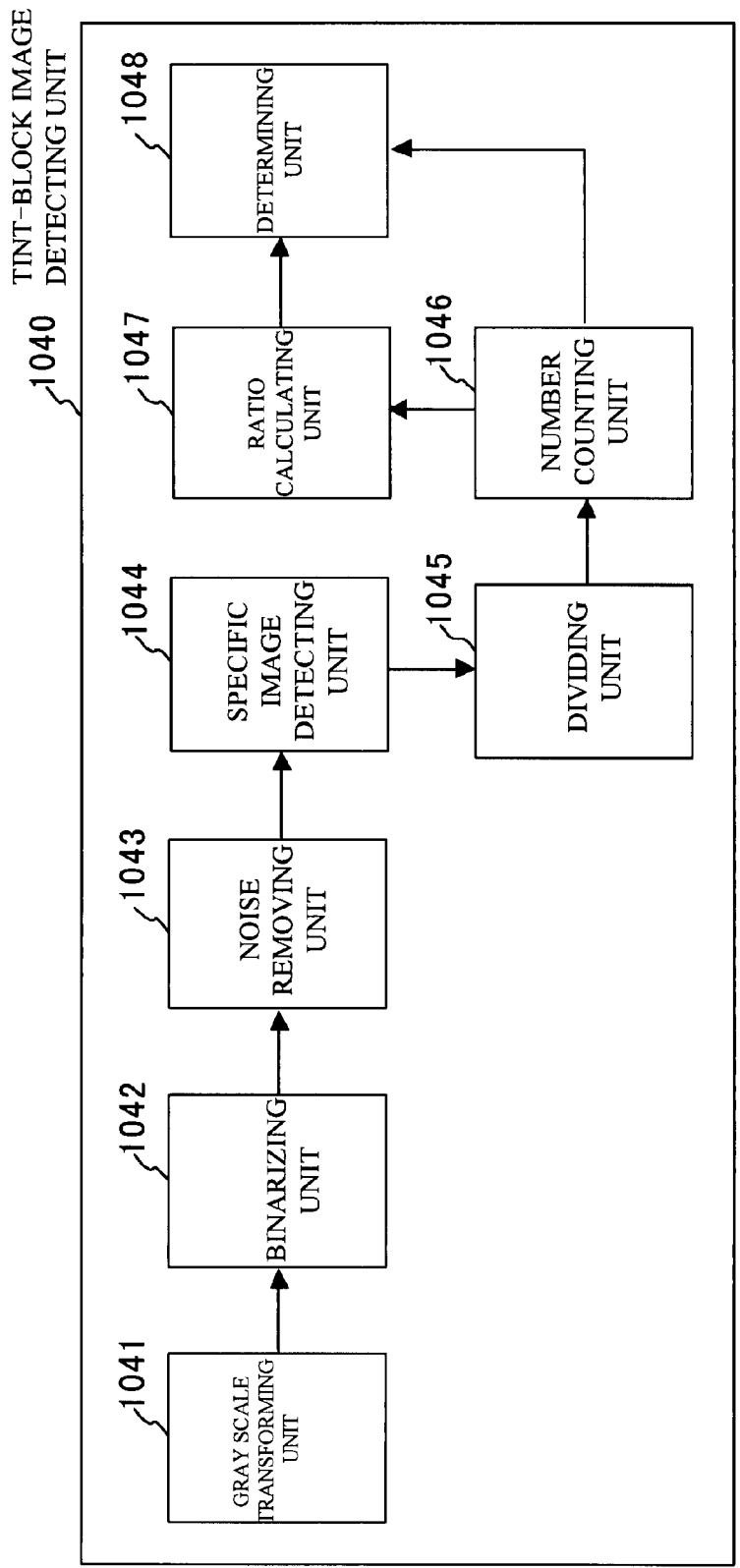
FIG. 7 is a functional block diagram of a tint-block image detecting unit.

Referring now to FIG. 7, the structure of the tint-block image detecting unit 1040 is described. FIG. 7 is a functional block diagram of the tint-block image detecting unit of this exemplary embodiment.

The tint-block image detecting unit 1040 includes a gray scale transforming unit 1041, a binarizing unit 1042, a noise removing unit 1043, a specific image detecting unit 1044, a dividing unit 1045, a number counting unit 1046, a ratio calculating unit 1047, and a determining unit 1048.

Although not shown in the drawing, the gray scale transforming unit 1041 is connected to the image reading unit 1020 and the binarizing unit 1042. The gray scale transforming unit 1041 obtains a read image from the image reading unit 1020. The gray scale transforming unit 1041 then performs a gray scale transformation on the obtained image. The gray scale transforming unit 1041 then outputs the gray scale image to the binarizing unit 1042.

The binarizing unit 1042 is connected to the gray scale transforming unit 1041 and the noise removing unit 1043. The binarizing unit 1042 obtains the gray scale image from the gray scale transforming unit 1041. The binarizing unit 1042 then performs a binarizing operation so that each of the pixels of the gray scale image is represented by the two values of 0 and 1, which represent black and white, respectively. The binarizing unit 1042 then outputs the binarized image to the noise removing unit 1043.

The noise removing unit 1043 is connected to the binarizing unit 1042 and the specific image detecting unit 1044. The noise removing unit 1043 obtains the binarized image information from the binarizing unit 1042. The noise removing unit 1043 then performs a noise removing operation.

More specifically, the noise removing unit 1043 detects a block of pixels formed by combined black pixels. If the size of the pixel block (the number of combined pixels) is within a predetermined range, the noise removing unit 1043 replaces each of the pixels forming the pixel block with a white pixel.

The predetermined range is set so that the specific images PS that are diagonal-line images, the independent specific dots that are the other specific images, and the characters and figures in the document, are not erased. Lastly, the noise removing unit 1043 outputs the image information subjected to the noise removal to the specific image detecting unit 1044.

The specific image detecting unit 1044 is connected to the noise removing unit 1043 and the dividing unit 1045. The specific image detecting unit 1044 obtains the image information subjected to the noise removal from the noise removing unit 1043. The specific image detecting unit 1044 then detects the specific images (diagonal-line images) PS.

More specifically, the specific image detecting unit 1044 detects the image information corresponding to the diagonal-line images PS, based on the information containing the image information. If the information corresponding to the specific image (diagonal-line image) PS0 representing "bit 0" is detected, the specific image detecting unit 1044 outputs a pixel value "0". If the information corresponding to the specific image (diagonal-line image) PS1 representing "bit 1" is detected, the specific image detecting unit 1044 outputs a pixel value "1". If no specific images (diagonal-line images)

PS are detected, the specific image detecting unit 1044 outputs a pixel value "3". Lastly, the specific image detecting unit 1044 outputs the image information indicating the detection result with respect to each pixel to the dividing unit 1045.

The dividing unit 1045 is connected to the specific image detecting unit 1044 and the number counting unit 1046. The dividing unit 1045 obtains the image information obtained as a result of an operation of detecting the specific images (diagonal-line images) PS from the specific image detecting unit 1044.

The dividing unit 1045 then divides the obtained image, information into rectangular areas of a predetermined size. Here, the predetermined size of each of the rectangular areas is smaller than a half the size of the area of the restriction codes CP and the information codes CD, and at least one of the rectangular areas is contained in the area of the restriction codes CP and the information codes CD. Lastly, the dividing unit 1045 outputs the divided image information to the number counting unit 1046.

The number counting unit 1046 is connected to the dividing unit 1045, the ratio calculating unit 1047, and the determining unit 1048. The number counting unit 1046 obtains the divided image information from the dividing unit 1045. The number counting unit 1046 then counts the number of pixels with the pixel value "0" and the number of pixels with the pixel value "1" in each rectangular area. The number counting unit 1046 then outputs the count results to the ratio calculating unit 1047. The number counting unit 1046 also outputs the total number of pixels with the pixel value "0" and pixels with the pixel value "1" to the determining unit 1048.

The ratio calculating unit 1047 is connected to the number counting unit 1046 and the determining unit 1048. The ratio calculating unit 1047 obtains the number of pixels with the pixel value "0" and the number of pixels with the pixel value "1" from the number counting unit 1046. The ratio calculating unit 1047 then calculates the proportion of the pixels with the pixel value "0", and outputs the result to the determining unit 1048.

The determining unit 1048 is connected to the number counting unit 1046, the ratio calculating unit 1047, and the control unit 1100. The determining unit 1048 obtains the total number of pixels with the pixel value "0" and pixels with the pixel value "1" from the number counting unit 1046. The determining unit 1048 also obtains the proportion of the pixels with the pixel value "0" from the ratio calculating unit 1047. Based on the obtained information, the determining unit 1048 performs a determining operation.

To explain the determining operation, the characteristics to be utilized in the determining operation are described. If the inside of a rectangular area being processed is located inside the restriction code CP1 in which all the bits represent "1", the diagonal-line images corresponding to more than a predetermined number of bits "1" in the rectangular area, and few diagonal-line images corresponding to bits "0" are detected. Accordingly, the proportion of the diagonal-line images corresponding to bits "0" is very small and is almost 0.0.

If the rectangular area being processed contains at least a part of an information code, the diagonal-line images PS0 corresponding to bits "0" and the diagonal-lines PS1 corresponding to bits "1" are detected from the inside of the rectangular area. Accordingly, the proportion of the diagonal-line images PS0 corresponding to bits "0" is smaller than 1.0 and is larger than 0.0, falling in the range of 0.1 to 0.9.

If the input image information represents an image having the information codes CD buried therein, the restriction codes CP0 in which all the bits in the rectangular areas represent "0", and the restriction codes CP1 in which all the bits in the rectangular areas represent "1" are buried in the image.

The following determining operation utilizing the above characteristics is performed.

If the total number of pixels with the pixel value "0" is larger than a first threshold value, and the proportion of the pixels with the pixel value "0" is larger than a second threshold value, the determining unit 1048 determines that the subject rectangular area is a restriction code in which all the bits represent "0" (hereinafter referred to simply as a "restriction code 0").

If the total number of pixels with the pixel value "1" is larger than the first threshold value, and "1—the proportion of the pixels with the pixel value "0"" is larger than the second threshold value, the determining unit 1048 determines that the subject rectangular area is a restriction code in which all the bits represent "1" (hereinafter referred to simply as a "restriction code 1").

In any other cases than the above two cases, the determining unit 1048 determines that the subject rectangular area is not a restriction code CP.

Based on the size of each rectangular area and the size of each specific image, the first threshold value is designed to have a buffer value added to the logical number of specific images that should be contained in each rectangular area.

The determining unit 1048 calculates the number of rectangular areas determined to be restriction codes 0, and the number of rectangular areas determined to be restriction codes 1, independently of each other. If the number of rectangular areas determined to be restriction codes 0 is equal to or larger than a threshold value "3", and the number of rectangular areas determined to be restriction codes 1 is equal to or larger than the threshold value "3", the determining unit 1048 determines that the subject image contains the tint-block image PB having the restriction codes, and outputs the determination result to the control unit 1100.

Referring back to FIG. 2, the explanation of the structure of the image processing device is continued.

The information acquiring unit 1050 is connected to the image reading unit 1020 and the control unit 1100. The information acquiring unit 1050 obtains the image read by the image reading unit 1020.

The information acquiring unit 1050 then obtains the code information from the code areas AC forming the background tint-ground image W contained in the obtained image. The information acquiring unit 1050 decodes the obtained code information. The information acquiring unit 1050 then outputs the decoded code information to the control unit 1100.

Figure 8:
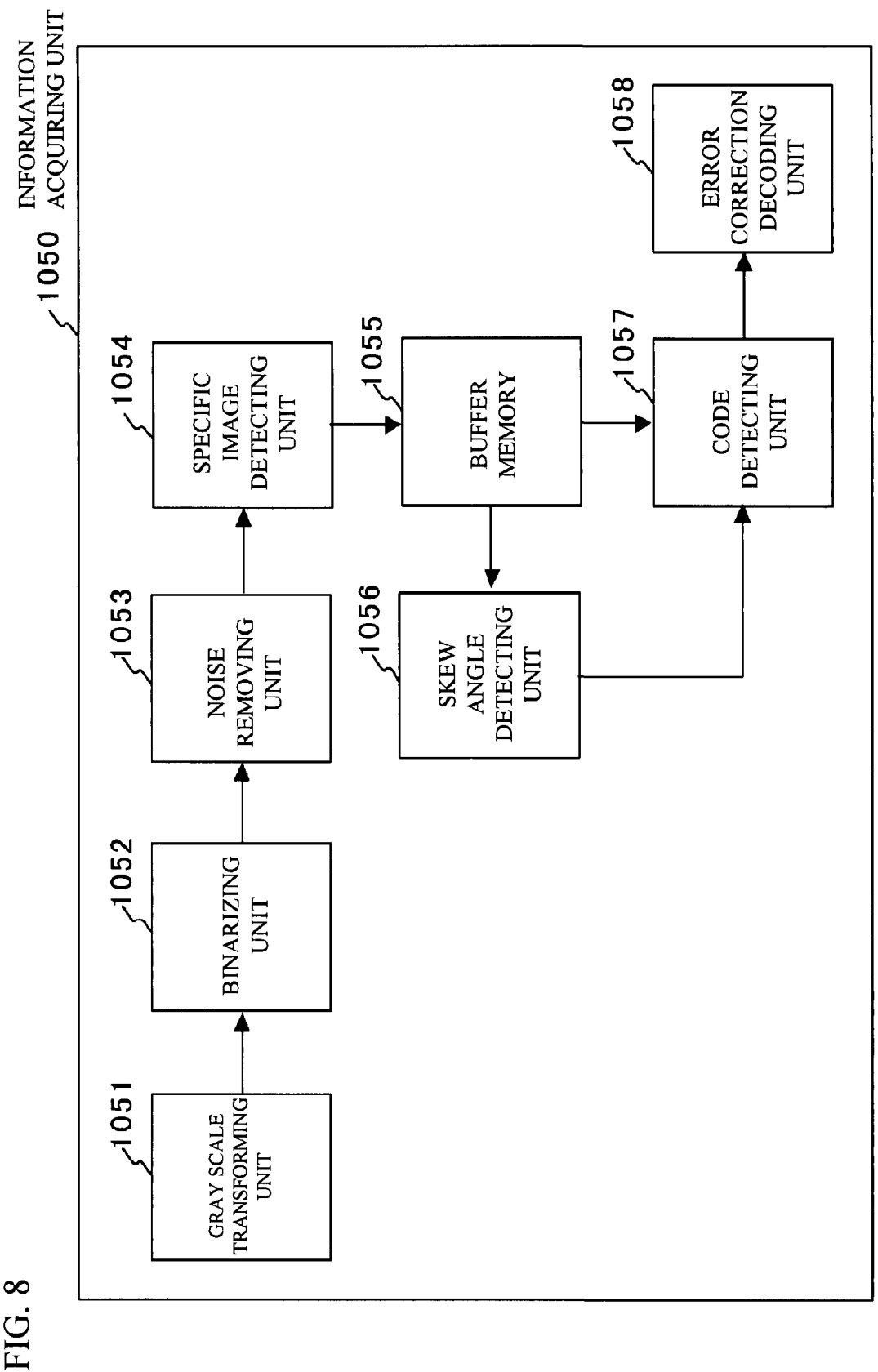
FIG. 8 illustrates the structure of an example of the information acquiring unit.

Referring now to FIG. 8, the structure of the information acquiring unit 1050 is described. FIG. 8 illustrates an example structure of the information acquiring unit 1050.

The information acquiring unit 1050 includes a gray scale transforming unit 1051, a binarizing unit 1052, a noise removing unit 1053, a specific image detecting unit 1054, a buffer memory 1055, a skew angle detecting unit 1056, a code detecting unit 1057, and an error correction decoding unit 1058.

Since the gray scale transforming unit 1051, the binarizing unit 1052, the noise removing unit 1053, and the specific image detecting unit 1054 of the information acquiring unit 1050 are the same as the gray scale transforming unit 1041, the binarizing unit 1042, the noise removing unit 1043, and the specific image detecting unit 1044 of the tint-block image detecting unit 1040, explanation of them is omitted here.

The buffer memory 1055 is an external memory device such as a SDRAM (Synchronous Dynamic Random Access Memory) or a hard disk. The buffer memory 1055 is connected to the specific image detecting unit 1054, the skew angle detecting unit 1056, and the code detecting unit 1057.

The image information from which specific images have been detected by the specific image detecting unit 1054 is stored in the buffer memory 1055. The skew angle detecting unit 1056 and the code detecting unit 1057 refer to the image information stored in the buffer memory 1055.

The skew angle detecting unit 1056 is connected to the buffer memory 1055 and the code detecting unit 1057. The skew angle detecting unit 1056 refers to the image information stored in the buffer memory 1055. The skew angle detecting unit 1056 then detects a skew angle from the image information, and calculates the skew angle. Lastly, the skew angle detecting unit 1056 outputs the skew angle to the code detecting unit 1057.

The code detecting unit 1057 is connected to the buffer memory 1055, the skew angle detecting unit 1056, and the error correction decoding unit 1058. The code detecting unit 1057 refers to the image information stored in the buffer memory 1055. The code detecting unit 1057 then receives the skew angle from the skew angle detecting unit 1056. Based on the skew angle and the image information, the code detecting unit 1057 performs a code information detecting operation.

More specifically, based on the skew angle, the code detecting unit 1057 extracts pixels with the pixel value "0" or "1" (pixels corresponding to "bits 0" or "bits 1"). The code detecting unit 1057 then detects synchronization codes from the extracted bit string. The synchronization codes are defined as codes formed with bits "1" that constitute the external periphery of a rectangular area having a predetermined length and width. The bit string surrounded by the synchronization codes is equivalent to the code information. The code detecting unit 1057 rearranges the bit string into a one-dimensional bit string, and outputs the rearranged bit string to the error correction decoding unit 1058.

The error correction decoding unit 1058 is connected to the code detecting unit 1057 and the control unit 1100. The error correction decoding unit 1058 performs an error correction decoding operation on the code information obtained from the code detecting unit 1057. The error correction decoding unit 1058 then outputs the code information subjected to the error correction decoding to the control unit 1100.

Referring back to FIG. 2, the explanation of the image processing device 1000 is continued.

The image storing unit 1060 has a memory unit that is an external memory device such as a hard disk or a flash memory. The image storing unit 1060 is connected to the image developing unit 1010, the read image processing unit 1030, and the control unit 1100. The image storing unit 1060 obtains original images from the image developing unit 1010 and the read image processing unit 1030. Under the control of the control unit 1100, the image storing unit 1060 also stores the obtained original images into the memory unit of the image storing unit 1060.

The output unit 1070 may be a printer, for example, and is connected to the image storing unit 1060 and the control unit 1100. Under the control of the control unit 1100, the output unit 1070 obtains images from the image storing unit 1060, and prints out the obtained images onto a printing medium such as a printing paper sheet or board.

In this exemplary embodiment, the output unit 1070 prints out more than one image obtained from the image storing unit 1060 onto the same printing face of one printing medium. In a specific example case, the output unit 1070 prints out two original images obtained from two pages that constitute an original document, onto the same printing face (the surface or the back face) of one printing paper sheet (so-called "two-up printing").

In this exemplary embodiment, the output unit 1070 may be a printer, for example, and prints out images obtained from the image storing unit 1060 onto a medium such as a printing paper sheet. However, the present invention is not limited to that structure. For example, the output unit 1070 may be a network card or a USB (Universal Serial Bus) card. In such a case, the output unit 1070 transmits images obtained from the image storing unit 1060 over a network connected to the output unit 1070, or outputs the images to an external memory device connected to the output unit 1070.

Before the control unit 1100 is explained, the input unit 1110 and the display unit 1120 are described.

The input unit 1110 may be a keyboard, a touch panel, a pointing device, or buttons, for example. The input unit 1110 is connected to the control unit 1100. The input unit 1110 is operated by a user of the image processing device 1000, so that various kinds of information such as control information and various kinds of instructions are input through the input unit 1110.

The display unit 1120 may be a liquid crystal panel or a CRT (Cathode Ray Tube), for example. The display unit 1120 is also connected to the control unit 1100. Under the control of the control unit 1100, the display unit 1120 displays various kinds of information.

The input unit of the remote terminal 9000 and the input unit 1110 of the image processing device 1000 will be hereinafter referred to as the input units 1110. The display unit of the remote terminal 9000 and the display unit 1120 of the image processing device 1000 will be hereinafter referred to as the display units 1120.

The control unit 1100 is connected to the tint-block image detecting unit 1040, the information acquiring unit 1050, the image storing unit 1060, and the output unit 1070. The control unit 1100 controls the tint-block image detecting unit 1040, the information acquiring unit 1050, the image storing unit 1060, and the output unit 1070.

When the image processing device 1000 performs a copying or image output operation, the control unit 1100 controls the operations performed by the respective components of the image processing device 1000. Referring now to FIGS. 9 through 17, control operations to be performed by the control unit 1100 are described.

Figure 9A:
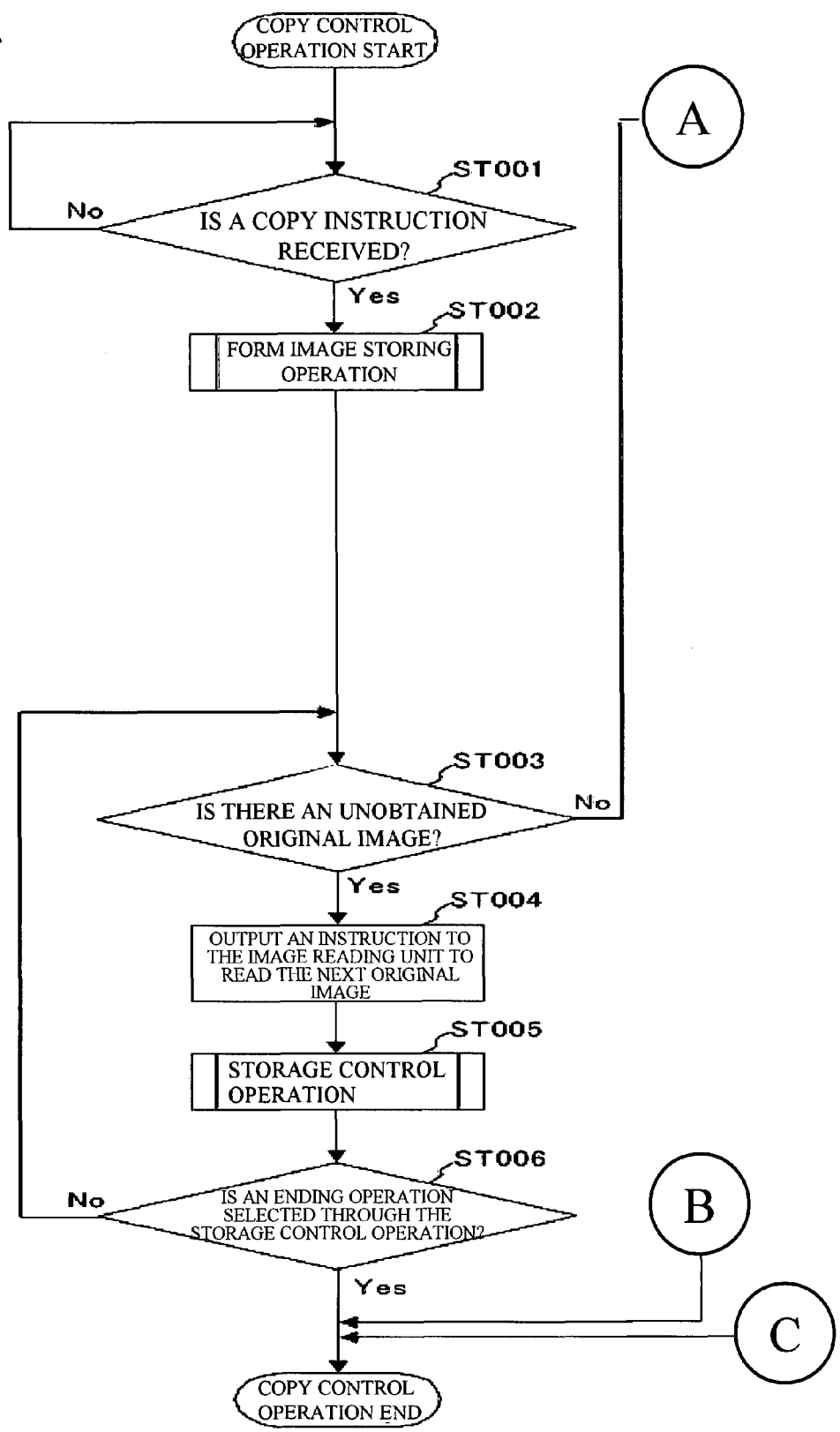
FIG. 9A and FIG. 9B are a flowchart showing an example of a copy control operation to be performed by the control unit.
Figure 9B:
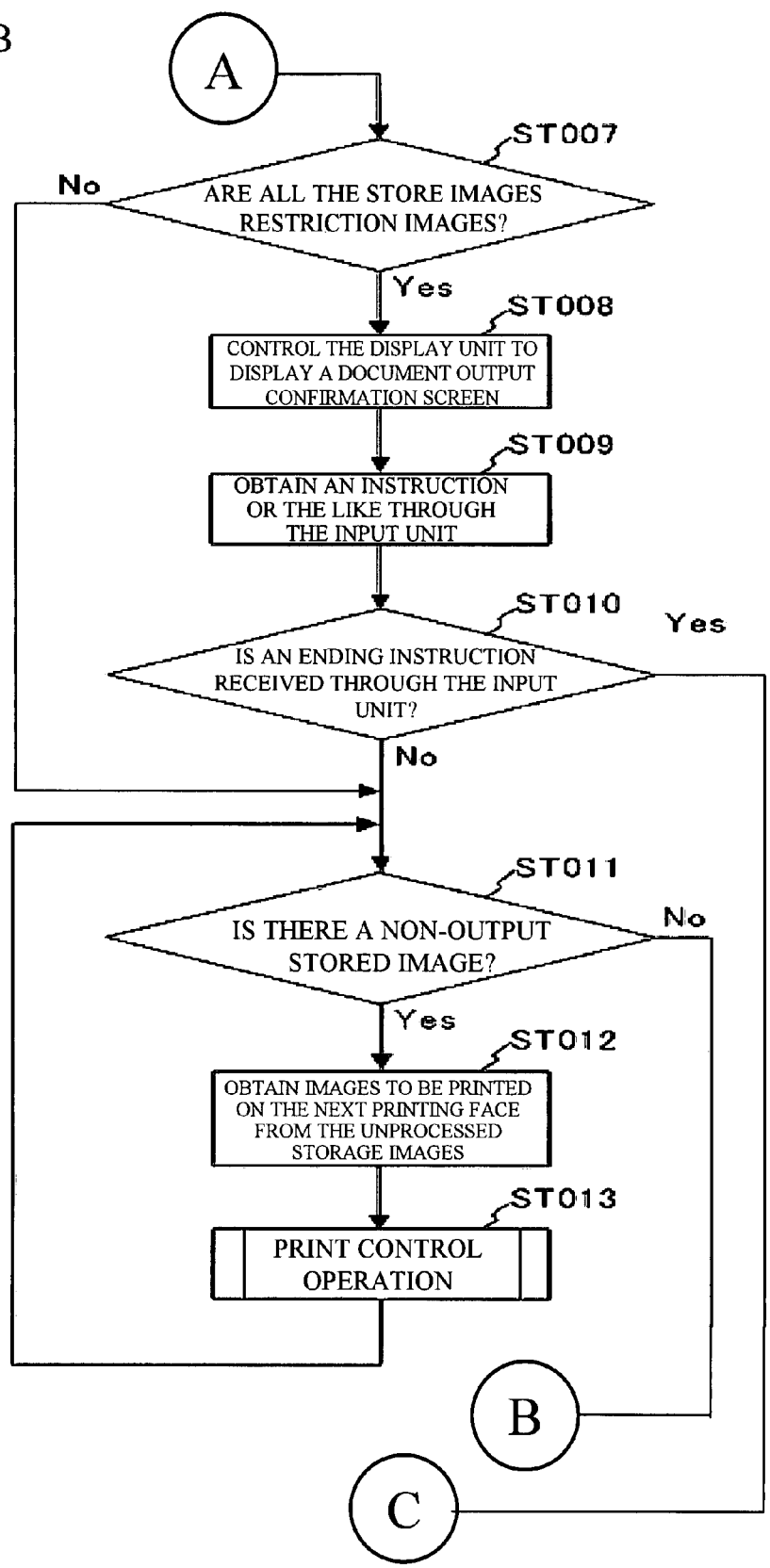

FIG. 9A and FIG. 9B are a flowchart showing an example of a control operation to be performed by the control unit 1100 when the image processing device 1000 performs a copying operation (the control operation will be hereinafter referred to as the copy control operation).

First, the user places an original document to be copied on the image reading unit 1020 in a copying operation to be performed by the image processing device 1000. The user operates the input units 1110, so as to input an instruction to perform a copying operation (the instruction will be hereinafter referred to simply as the copying instruction).

The control unit 1100 then determines whether the copying instruction input through the input units 1110 is received (step ST001). If the copying instruction is received, the control unit 1100 moves on to step ST002. If the copying instruction is not received, the control unit 1100 repeats the procedure of step ST001 after sleeping for a predetermined period of time, though not shown in the flowchart.

In a case where the control unit 1100 determines that the copying instruction input through the input units 1110 has been received in step ST001, the control unit 1100 performs a later described form image storing process (step ST002).

The form image storing process is a control operation to be performed by the control unit 1100 to obtain a form image. A form image is an image contained in a restriction image, and is not a blank. A restriction image is an image that indicates that outputs of the original image are restricted, and contains a character image such as "COPYING PROHIBITED" or "FOR INTERNAL USE ONLY".

The control unit 1100 then determines whether there is an image that is an original image of the original document and is not to be read by the image reading unit 1020 in accordance with an instruction that is output in a later step ST005 (the image will be hereinafter referred to simply as an "unobtained original image") (step ST003). If there is an unobtained original image, the control unit 1100 moves on to step ST004. If there is not an unobtained original image, the control unit 1100 carries out the procedure of step ST007.

If the control unit 1100 determines that there is an unobtained original image in step ST003, the control unit 1100 outputs an instruction to the image reading unit 1020 so as to read only the printing medium having the smallest number in the original document to be copied (or the printing medium placed at the top among the stacked printing media), and obtain the original image printed on the read printing medium (the image obtained here will be hereinafter referred to simply as the "next original image") (step ST004).

The control unit 1100 then performs a later described storage control operation (step ST005). The storage control operation is an operation to be performed to control the image storing unit 1060 so as to store an original image read by the image reading unit 1020 or store a restriction image in place of an original image.

In the later described storage control operation, the control unit 1100 determines whether the user of the image processing device 1000 has selected an end operation (step ST006). If the control unit 1100 determines that the user of the image processing device 1000 has selected an end operation, the control unit 1100 ends the copy control operation. If not, the control unit 1100 returns to step ST003, and repeats the above-described procedures.

If the control unit 1100 determines that there is not an unobtained original image in step ST003, the control unit 1100 determines whether all the images stored during the storage control operation performed in step ST005 are restriction images (the images will be hereinafter referred to simply as the stored images) (step ST007). If all the stored images are determined to be restriction images, the control unit 1100 carries out the procedure of step ST008. If not, the control unit 1100 carries out the procedure of step ST011.

If the control unit 1100 determines that all the stored images are restriction images in step ST007, the control unit 1100 controls the display units 1120 so as to display a later described document output confirmation screen (step ST008). The control unit 1100 then obtains an instruction from the input units 1110 to complete the copy control operation, or an instruction from the input units 1110 to stop the copy control operation (a terminating instruction) (step ST009).

The control unit 1100 determines whether a terminating instruction has been obtained from the input units 1110 in step ST009 (step ST010). If the control unit 1100 determines that a terminating instruction has been obtained, the control unit 1100 ends the copy control operation. If not, the control unit 1100 carries out the procedure of step ST011.

If the control unit 1100 determines that all the stored images are restriction images in step ST007, or if the control unit 1100 determines that a terminating instruction has been received in step ST010, the control unit 1100 determines whether there is a stored image on which a later described print control operation has not been performed yet (the stored image will be hereinafter referred to simply as a "non-output stored image") (step ST011).

If the control unit 1100 determines that there is a non-output stored image, the control unit 1100 carries out the procedure of step ST012. If not, the control unit 1100 ends the copy control operation. The print control operation is an operation to be performed to control the output unit 1070 so as to print out a stored image.

If the control unit 1100 determines that there is a non-output stored image in step ST011, the control unit 1100 obtains stored images to be printed out by the output unit 1070 on the same printing face of a printing medium, with the one stored first among the unprocessed stored images being the first one to be printed out (the images will be hereinafter referred to simply as the "images to be printed out on the next printing face") (step ST012). In a specific example case where the output unit 1070 prints out the images of two pages on the same printing face of a printing paper sheet (so-called "two-up printing"), the two stored images that are non-output stored images and have been stored first are the images to be printed on the next printing face.

The control unit 1100 then performs the later described print control operation for the images to be printed on the next printing face (step ST013). The control unit 1100 then returns to step ST011, and repeats the above-described procedures.

Figure 10:
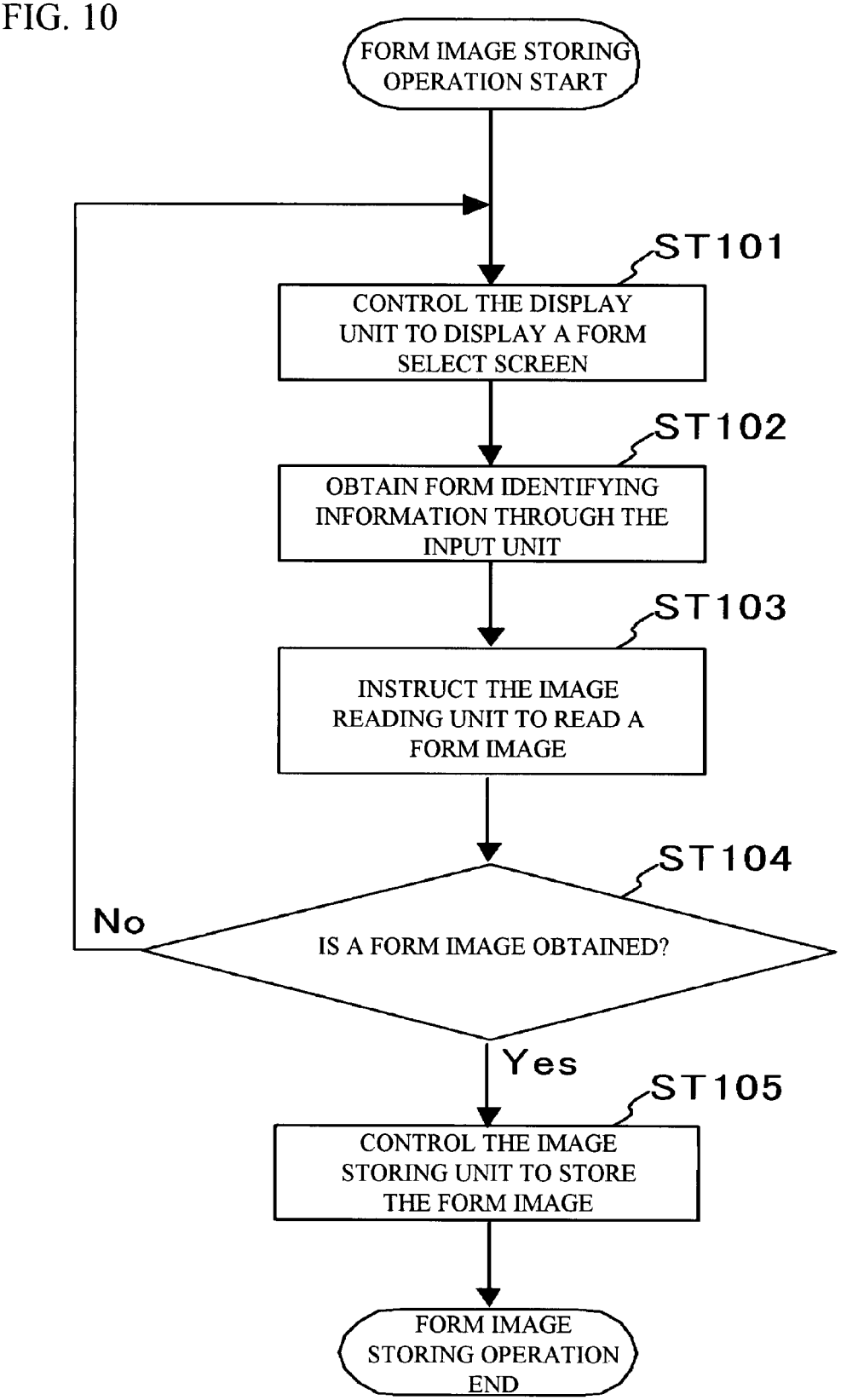
FIG. 10 is a flowchart showing an example of a form image storing operation to be performed by the control unit.

Referring now to FIG. 10, the form image storing operation to be performed by the control unit 1100 is described. FIG. 10 is a flowchart showing an example of the form image storing operation to be performed by the control unit 1100.

First, the control unit 1100 controls the display units 1120 to display a later described form image select screen (step ST101). A form image select screen is a screen that shows the information for identifying the form images that are input by the user operating the input units 1110 (the information will be hereinafter referred to simply as the form image identifying information).

The control unit 1100 then obtains the form image identifying information that is input by the user operating the input units 1110 (step ST102). The form image identifying information includes the page numbers in the original document. The user operates the input units 1110 so as to input the page number allotted to the printing paper sheet on which a form image is printed.

The control unit 1100 then controls the image reading unit 1020 so as to obtain the original image (or a form image) printed on the printing paper sheet having the same page number as the page number obtained as the form image identifying information (step S103). Here, it is assumed that the order in which the image reading unit 1020 reads the original images printed on the printing paper sheets of the original document corresponds to the page numbers in the original document.

The control unit 1100 then determines whether the image reading unit 1020 has obtained a form image (step ST104). If the control unit 1100 determines that the image reading unit 1020 has not obtained a form image, the control unit 1100 returns to step ST101, and repeats the above-described procedures. If the control unit 1100 determines that the image reading unit 1020 has obtained a form image, the control unit 1100 carries out the procedure of step ST105.

In a specific example case where the image reading unit 1020 has not obtained a form image, the form image identifying information indicates a page number that is larger than the total number of pages in the original document.

If the control unit 1100 determines that the image reading unit 1020 has obtained a form image in step ST104, the control unit 1100 controls the image storing unit 1060 to store the form screen read in step ST103 (step ST105).

In this exemplary embodiment, the control unit 1100 obtains the images read by the image reading unit 1020, and sets the images as form images. However, the present invention is not limited to that. For example, images that are stored beforehand in the ROM 1002 or the RAM 1003, or images that are produced by a personal computer or the like and are stored in the external memory unit 1004, may be obtained and used as form images.

More specifically, the external memory unit 1004 is an external memory device that is connected to the image processing device 1000 through "hot docking" via the bus 1005 compliant with the USB standard. The form images to be used here are images that are developed by the image developing unit 1010 on the basis of the information stored in the "hot-docking" external memory unit 1004.

Figure 11:
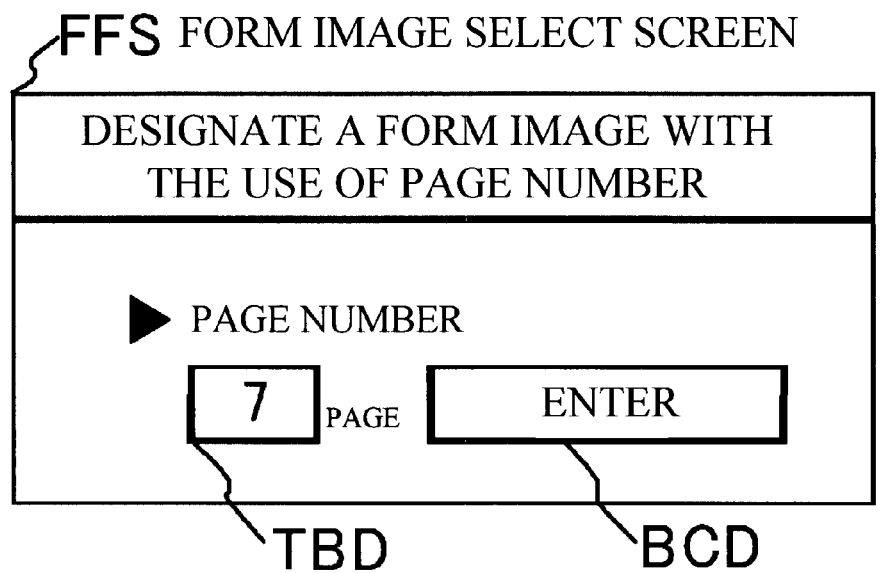
FIG. 11 shows an example of a form image select screen.

Referring now to FIG. 11, the form image select screen to be displayed on the display units 1120 in step ST101 is described. FIG. 11 shows an example of the form image select screen.

The form image select screen FFS shown in FIG. 11 includes an identifying information text box TBD and an identifying information enter button BCD.

The identifying information text box TBD shows the form image identifying information that is input by the user operating the input units 1110.

The identifying information enter button BCD is a display button through which a signal can be input so as to notify that an operation performed by the user operating the input units 1110 to input the form image identifying information has ended.

Figure 12A:
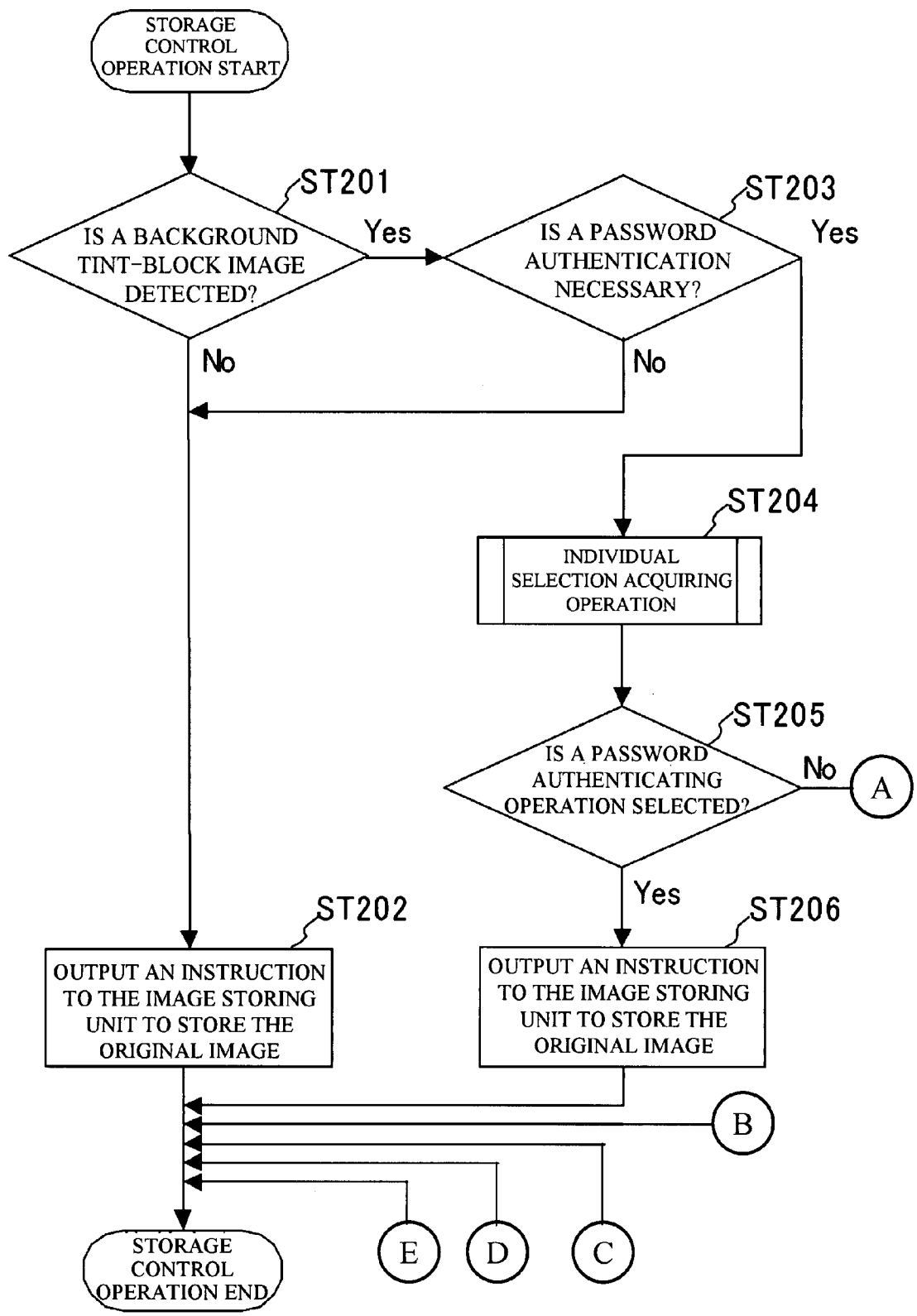
FIG. 12A and FIG. 12B are a flowchart showing an example of a storage control operation to be performed by the control unit in the first exemplary embodiment.
Figure 12B:
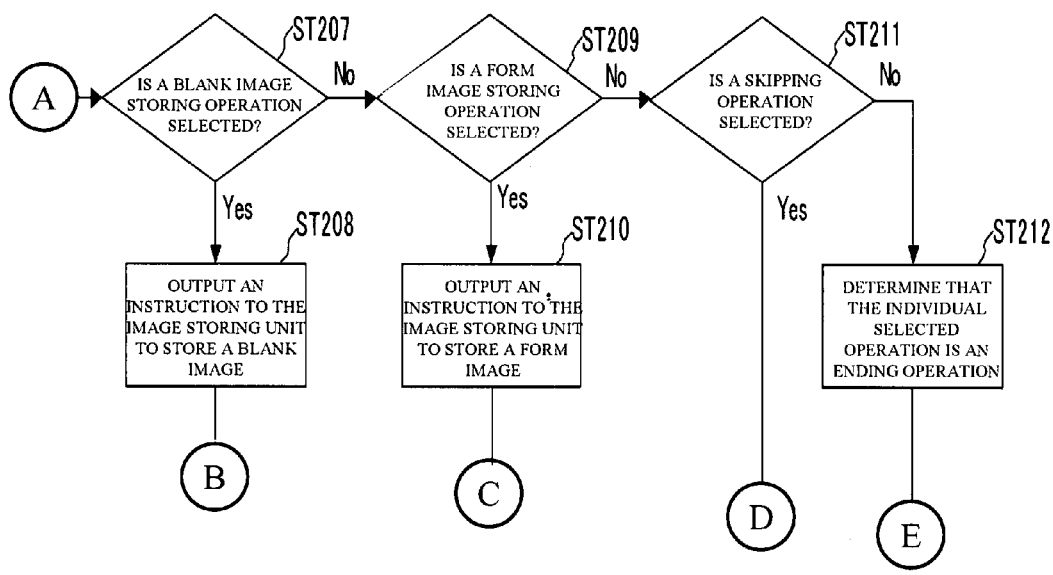

Referring now to FIG. 12A and FIG. 12B, the storage control operation is described. FIG. 12A and FIG. 12B are a flowchart showing an example of the storage control operation to be performed by the control unit 1100 in the first exemplary embodiment.

First, the control unit 1100 determines whether a background tint-block image has been detected from the subject original image (step ST201). The procedure of step ST201 is the same as the procedure of step ST105, and therefore, explanation of it is omitted here. If a background tint-block image has been detected from the original image, the control unit 1100 carries out the procedure of step ST203. If a background tint-block image has not been detected, the control unit 1100 carries out the procedure of step ST202.

If the control unit 1100 determines that a background tint-block image has not been detected from the original image in step ST201, or determines that there is no need to authenticate a password in step ST203, the control unit 1100 outputs an instruction to store the original image in the image storing unit 1060 (step ST202). The control unit 1100 then ends the storage control operation.

If the control unit 1100 determines that a background tint-block image has been detected in step ST201, the control unit 1100 determines whether a password needs to be authenticated (step ST203).

The control unit 1100 examines the control information, for example. If the control unit 1100 determines that the control information includes the information for requesting a password authentication and a password to be authenticated, the control unit 1100 determines that a password authentication needs to be performed.

If a password authentication needs to be performed, the control unit 1100 carries out the procedure of step ST204. If there is no need to perform a password authentication, the control unit 1100 carries out the procedure of step ST202.

If the control unit 1100 determines that a password authentication needs to be performed in step ST203, the control unit 1100 performs a later described individual selection acquiring operation. The individual selection acquiring operation is an operation to be performed by the control unit 1100 for each individual original image for which a password authentication needs to be performed. Through the individual selection acquiring operation, an operation selected by the user (hereinafter referred to simply as an individual selected operation) is obtained.

In this exemplary embodiment, the individual selected operations include: an operation of performing a password authentication (hereinafter referred to simply as a password authenticating operation); an operation of storing a blank in the image storing unit 1060, instead of an original image for which a password authentication is not to be performed and outputs are restricted (hereinafter referred to simply as a blank image storing operation); an operation of storing a form image in the image storing unit 1060, instead of a restricted original image (hereinafter referred to simply as a form image storing operation); an operation of not storing each restricted original image (hereinafter referred to simply as a skipping operation); and an operation of ending a copy control operation (hereinafter referred to simply as an ending operation).

The control unit 1100 then determines whether the individual selected operation selected through the individual selection acquiring operation is a password authenticating operation (step ST205). If the individual selected operation is determined to be a password authenticating operation, the control unit 1100 carries out the procedure of step S206. If the individual selected operation is determined not to be a password authenticating operation, the control unit 1100 carries out the procedure of step ST207.

If the individual selected operation is determined to be a password authenticating operation in step ST205, the control unit 1100 outputs an instruction to the image storing unit 1060 to store the original image (step ST206). The control unit 1100 then ends the storage control operation.

If the individual selected operation is determined not to be a password authenticating operation in step ST205, the control unit 1100 determines whether the individual selected operation is a blank image storing operation (step ST207). If the individual selected operation is determined to be a blank image storing operation, the control unit 1100 carries out the procedure of step ST208. If the individual selected operation is determined not to be a blank image storing operation, the control unit 1100 carries out the procedure of step ST209.

If the individual selected operation is determined to be a blank image storing operation in step ST207, the control unit 1100 outputs an instruction to the image storing unit 1060 to store a blank image (step ST208). The control unit 1100 then ends the storage control operation.

In this exemplary embodiment, blank images are stored beforehand in a predetermined directory of the image storing unit 1060. The control unit 1100 also makes a copy of an already stored blank image, so as to control the image storing unit 1060 to store the blank image in place of an original image for which a password authentication is not performed and outputs are restricted, without a change in the order of the original images read by the image reading unit 1020.

As described above, the blank images are stored beforehand in the predetermined directory of the image storing unit 1060 in this exemplary embodiment. However, the present invention is not limited to that arrangement. For example, blank images may be generated under the control of software.

As described above, the control unit 1100 makes a copy of an already stored blank image, so as to control the image storing unit 1060 to store the blank image in place of an original image for which outputs are restricted, without a change in the order of the original images read by the image reading unit 1020 in this exemplary embodiment. However, the present invention is not limited to that arrangement. For example, the control unit 1100 may convert all the pixels constituting the subject original image into pixels representing white, so as to perform a control operation to store a blank image in place of the original image.

If the individual selected operation is determined not to be a blank image storing operation in step ST207, the control unit 1100 determines whether the individual selected operation is a form image storing operation (step ST209). If the individual selected operation is determined to be a form image storing operation, the control unit 1100 carries out the procedure of step ST210. If the individual selected operation is determined not to be a form image storing operation, the control unit 1100 carries out the procedure of step ST211.

If the individual selected operation is determined to be a form image storing operation in step ST209, the control unit 1100 outputs an instruction to the image storing unit 1060 to store a form image (step ST210). The control unit 1100 then ends the storage control operation.

In this exemplary embodiment, the control unit 1100 makes a copy or the like of a form image already obtained through a form image storing operation, so as to control the image storing unit 1060 to store the form image in place of an original image for which outputs are restricted, without a change in the order of the original images read by the image reading unit 1020.

If the individual selected operation is determined not to be a form image storing operation in step ST209, the control unit 1100 determines whether the individual selected operation is a skipping operation (step ST211). If the individual selected operation is determined to be a skipping operation, the control unit 1100 ends the storage control operation. If the individual selected operation is determined not to be a skipping operation, the control unit 1100 carries out the procedure of step ST212.

If the individual selected operation is determined not to be a skipping operation in step ST207, the control unit 1100 determines that the individual selection acquiring operation is an ending operation (step ST212). The control unit 1100 then ends the storage control operation.

Figure 13:
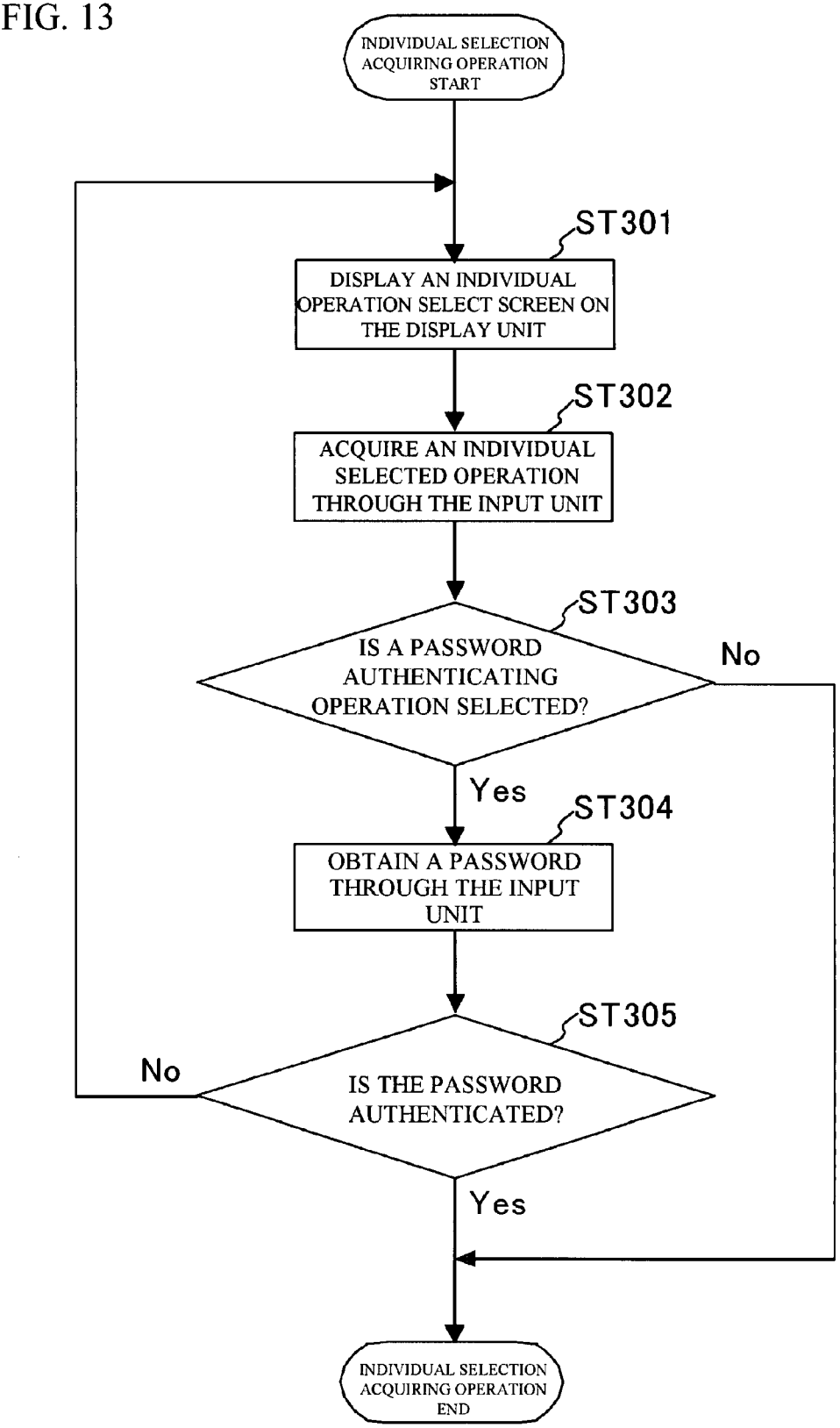
FIG. 13 is a flowchart showing an example of an individual selection acquiring operation to be performed by the control unit in the first exemplary embodiment.

Referring now to FIG. 13, the individual selection acquiring operation is described. FIG. 13 is a flowchart showing an example of the individual selection acquiring operation to be performed by the control unit 1100 in the first exemplary embodiment.

First, the control unit 1100 controls the display units 1120 to display an individual operation select screen (step ST301). The individual operation select screen is a screen that shows an operation that can be selected as individual selected operations.

The control unit 1100 acquires an individual selected operation that is input by the user operating the input units 1110 (step ST302). The control unit 1100 then determines whether the acquired individual selected operation is a password authenticating operation (step ST303). If the acquired individual selected operation is determined to be a password authenticating operation, the control unit 1100 carries out the procedure of step ST304. If the acquired individual selected operation is determined not to be a password authenticating operation, the control unit 1100 ends the individual selection acquiring operation.

If the acquired individual selected operation is determined to be a password authenticating operation in step ST303, the control unit 1100 obtains a password that is input by the user operating the input units 1110 (step ST304).

The control unit 1100 then determines whether the password obtained in step ST304 is to be authenticated (step ST305). If the password is determined to be authenticated, the control unit 1100 ends the individual selection acquiring operation. If the password is determined not to be authenticated, the control unit 1100 returns to step ST301, and repeats the above-described procedures.

In a specific example case where the control unit 1100 determines whether a password input by the user operating the input units 1110 is to be authenticated, the control unit 1100 compares the password with an authenticated password contained in the control information. If the two passwords are the same, the control unit 1100 determines that the password input by the user is to be authenticated.

Figure 14:
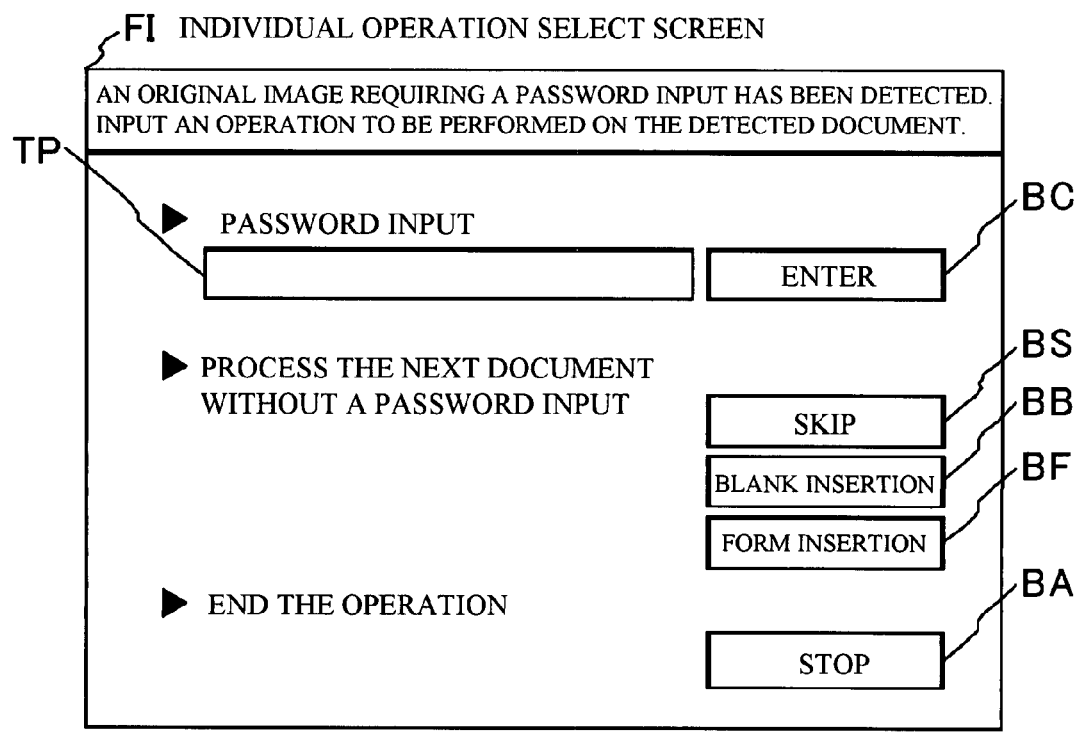
FIG. 14 shows an example of an individual operation select screen to be displayed by the display unit in the first exemplary embodiment.

Referring now to FIG. 14, the individual operation select screen FI is described. FIG. 14 shows an example of the individual operation select screen FI to be displayed by the display units 1120.

The individual operation select screen FI is formed with a password text box TP, a password enter button BC, a blank sheet insertion button BB, a form insertion button BF, a skip button BS, and an end button.

The password text box TP of the individual operation select screen FI displays a password that is input by the user operating the input units 1110.

The password enter button BC is a display button through which a signal can be input to indicate that an operation performed by the user operating the input units 1110 to input the password has ended.

The password enter button BC, the blank sheet insertion button BB, the form insertion button BF, the skip button BS, and the end button BA are display buttons through which signals can be exclusively input to select a password authenticating operation, a blank image storing operation, a form image storing operation, a skipping operation, and an ending operation as individual selected operations by operating the input units 1110.

Figure 15:
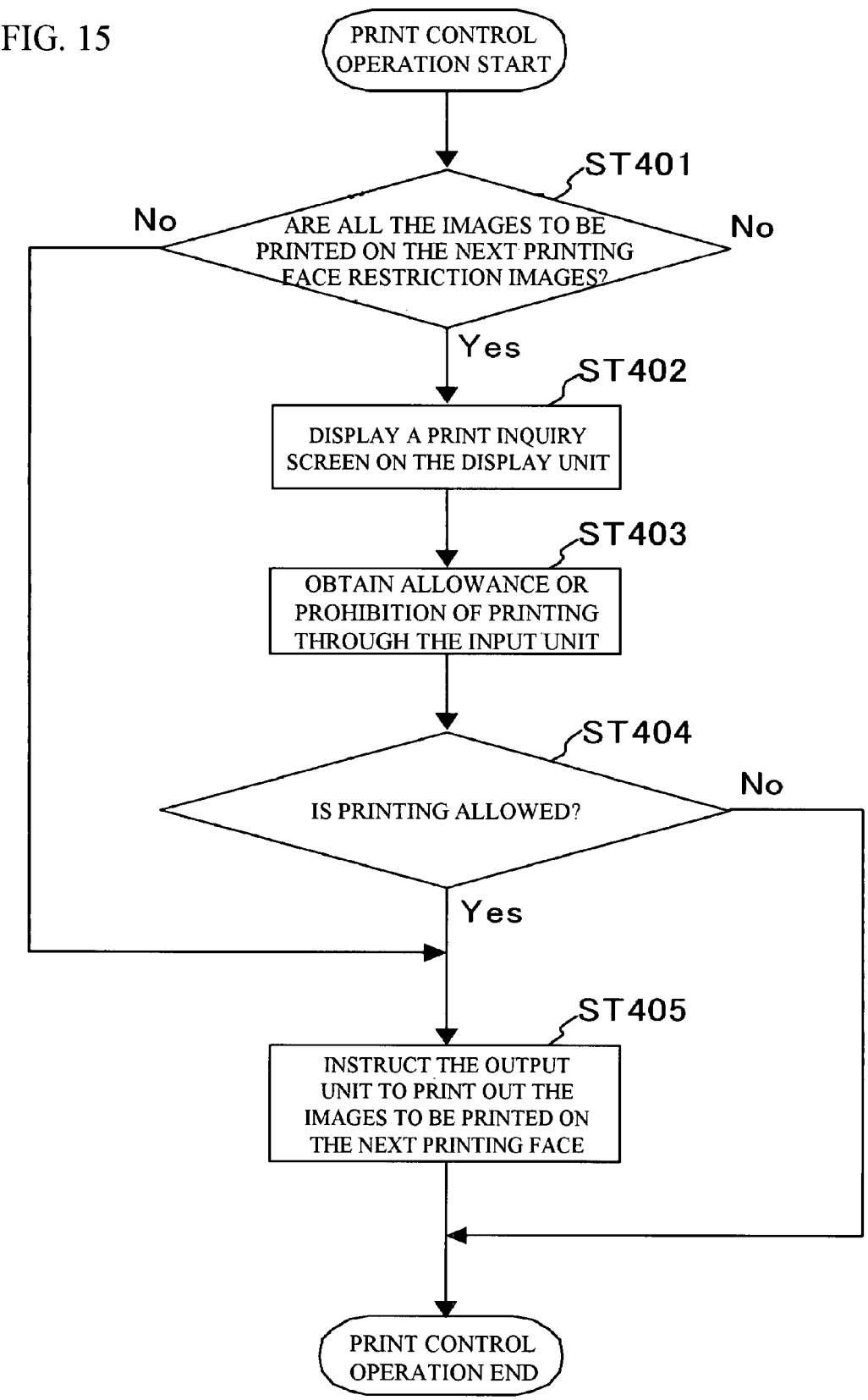
FIG. 15 is a flowchart showing an example of a print control operation to be performed by the control unit.

Referring now to FIG. 15, the print control operation is described. FIG. 15 is a flowchart showing an example of the print control operation to be performed by the control unit 1100.

First, the control unit 1100 determines whether all the images to be printed on the next printing face are restriction images (step ST401). If all the images to be printed on the next printing face are determined to be restriction images, the control unit 1100 carries out the procedure of step ST402. If not, the control unit 1100 carries out the procedure of step ST405.

If all the images to be printed on the next printing face are restriction images in step ST401, the control unit 1100 controls the display units 1120 to display a print inquiry screen (step ST402). The print inquiry screen is a display screen that indicates that printing can be allowed by the user operating the input units 1110.

The control unit 1100 then obtains allowance or prohibition of printing (step ST403).

Based on the allowance or prohibition of printing obtained through the input units 1110 in step ST403, the control unit 1100 determines whether to allow printing (step ST404). If printing is allowed, the control unit 1100 carries out the procedure of step ST405. If not, the control unit 1100 ends the print control operation.

If printing is allowed in step ST404, or if not all the printing images to be printed on the next printing face are restriction images in step ST401, the control unit 1100 outputs an instruction to the output unit 1070 so as to print out the images on the next printing face (step ST405). The control unit 1100 then ends the print control operation.

As described above, if all the images to be printed on the next printing face are determined to be restriction images in step ST401, the control unit 1100 carries out the procedures of steps ST402 through 404 in this exemplary embodiment. However, the present invention is not limited to that arrangement.

For example, where the control unit 1100 has already carried out the procedures of steps ST402 through ST404 and determines that printing is allowed in step ST404, or where the control unit 1100 determines that an instruction to perform an output operation is received even if all the stored images are determined to be restriction images in step ST010 in the copy control operation described with reference to FIG. 9B, the control unit 1100 may skip the procedures of steps ST402 through ST404, and carry out the procedure of step ST405 (outputs an instruction to the output unit 1070 to print out the subject images).

Figure 16:
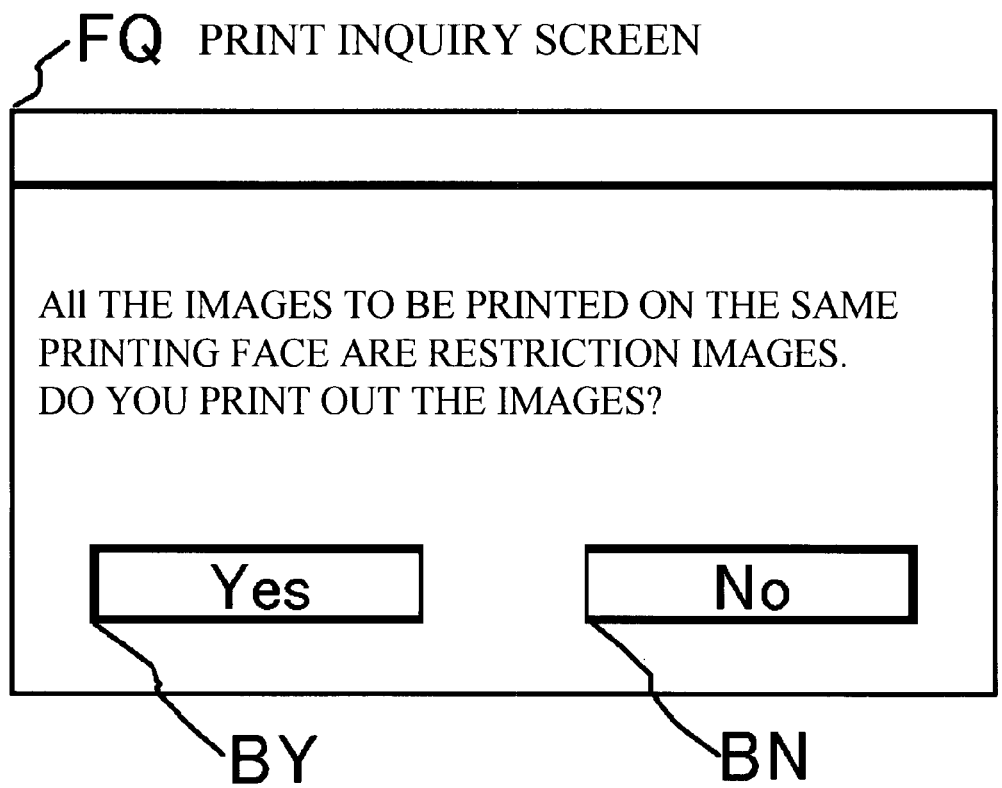
FIG. 16 shows an example of a print inquiry screen to be displayed by the display unit.

Referring now to FIG. 16, the print inquiry screen is described. FIG. 16 shows an example of the print inquiry screen FQ to be displayed by the display units 1120.

The print inquiry screen FQ shows a message to the effect that all the images to be printed on the next printing face are restriction images. Alternatively, the user operates the input units 1110 so as to display a message to prompt an input that indicates allowance or prohibition of printing of the images to be printed on the next printing face.

The print inquiry screen FQ has a "Yes" button and a "No" button. The "Yes" button and the "No" button are display buttons through which the user can input an instruction to allow or prohibit printing of the images to be printed on the next printing face by operating the input units 1110.

In this exemplary embodiment, the image developing unit 1010 and the image reading unit 1020 are equivalent to the image obtaining unit in the claims. The information acquiring unit 1050 is equivalent to the information acquiring unit in the claims. The input unit 1110 is equivalent to the input unit in the claims. The output unit 1070 is equivalent to the output unit in the claims. The control unit 1100 is equivalent to the control unit in the claims.

In the following, a second exemplary embodiment of the present invention is described.

An image processing device in accordance with the second exemplary embodiment does not need to acquire an operation for an original image every time an original image having a restriction imposed on the outputs thereof is detected.

Second Exemplary Embodiment

The image processing device in accordance with the second exemplary embodiment has substantially the same structure and functions as the image processing device 1000 in accordance with the first exemplary embodiment. Therefore, the aspects that are different from the first exemplary embodiment will be described in the following.

Figure 17A:
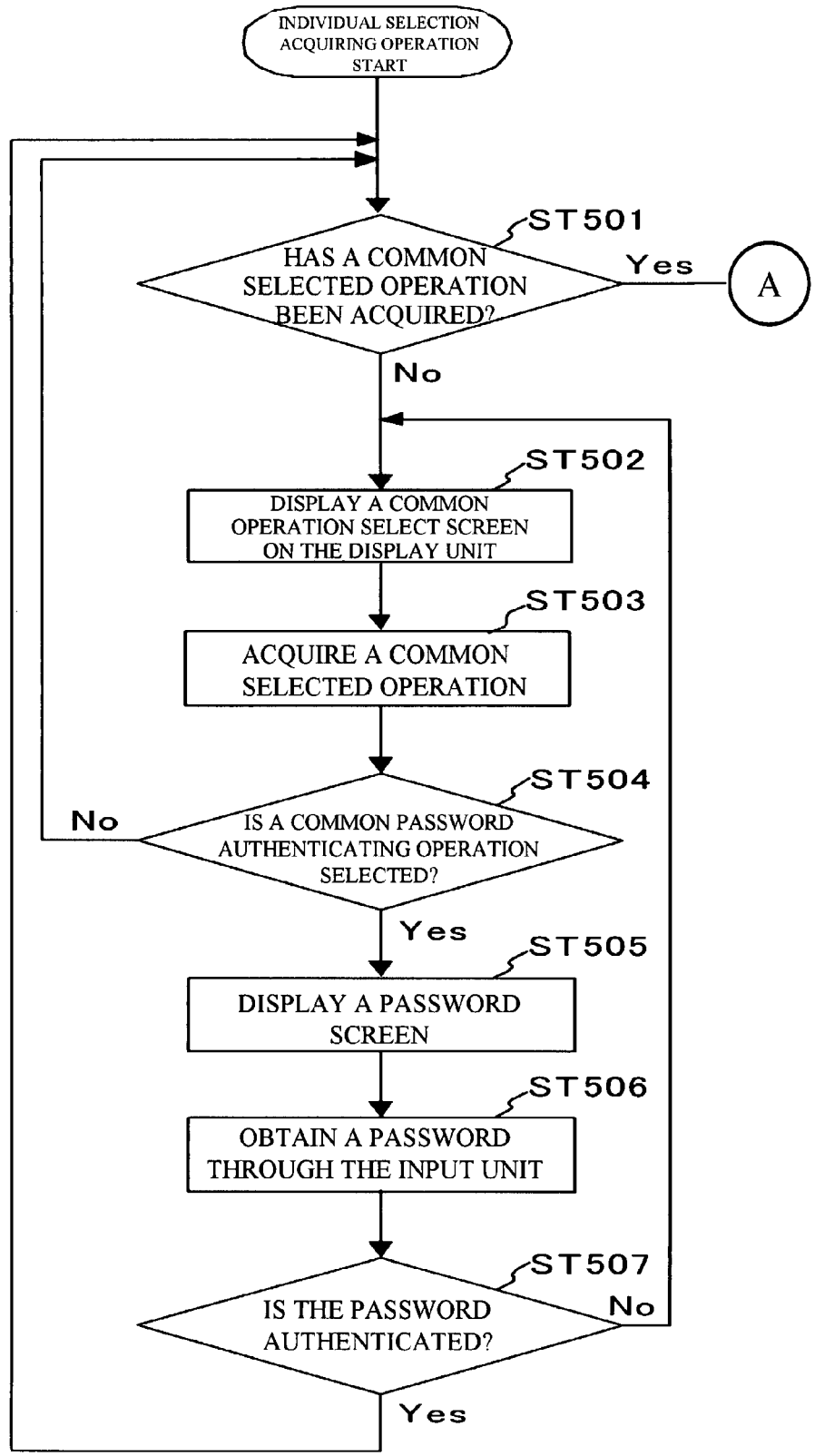
FIG. 17A and FIG. 17B are a flowchart showing an example of an individual selection acquiring operation to be performed by the control unit in a second exemplary embodiment of the present invention.
Figure 17B:
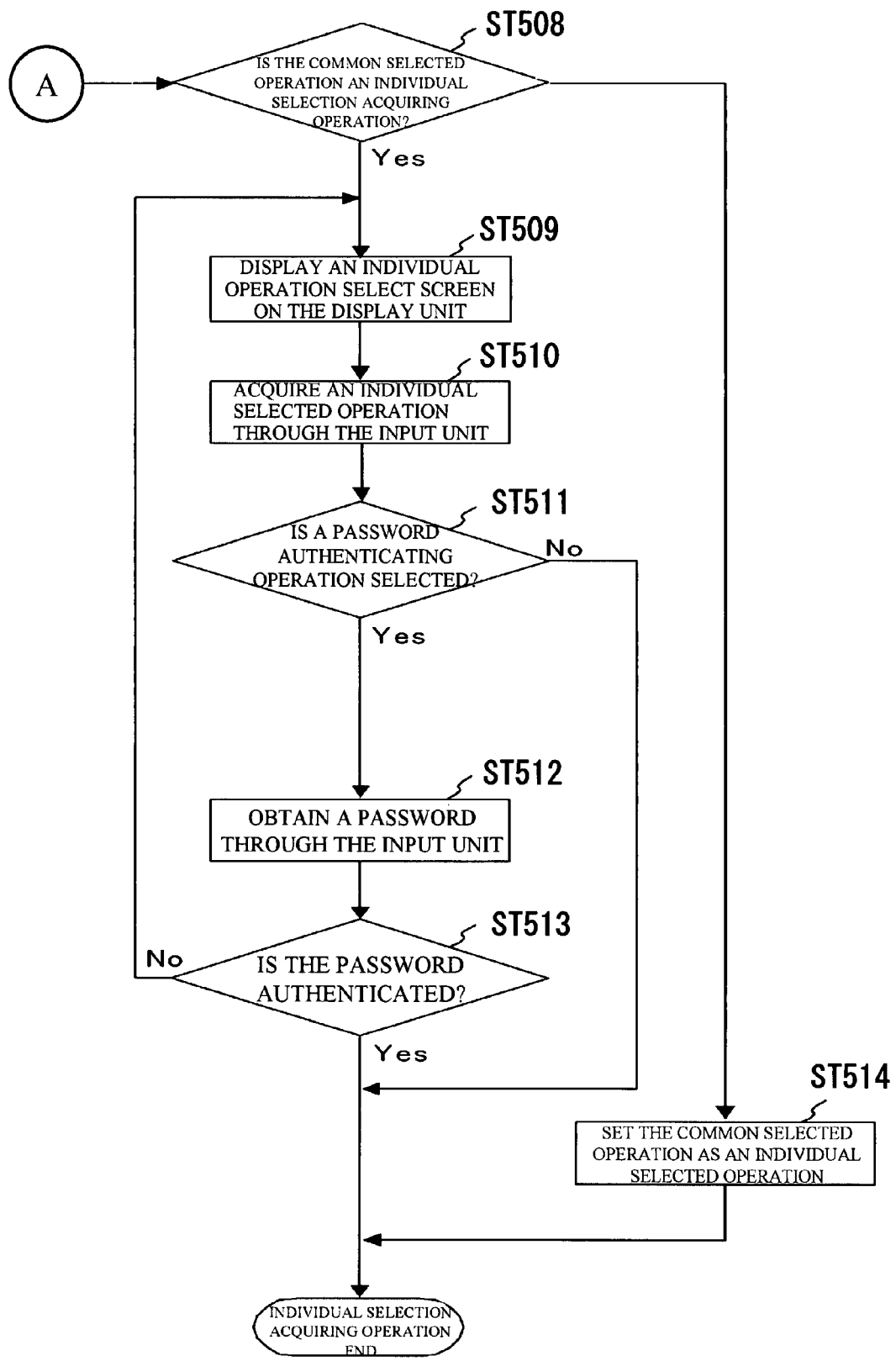

Referring first to FIG. 17A and FIG. 17B, an individual selection acquiring operation in accordance with the second exemplary embodiment is described. FIG. 17A and FIG. 17B are a flowchart showing an example of the individual selection acquiring operation to be performed by the control unit 1100 in accordance with the second exemplary embodiment.

First, the control unit 1100 determines whether a common selected operation has already been acquired (step ST501). Common selected operations are operations to be performed by the control unit 1100 for all the original images having passwords that need to be authenticated. Each common selected operation is to be selected by a user.

In this exemplary embodiment, the common selected operations include: an operation of storing all the original images having passwords authenticated with the use of a common password (hereinafter referred to simply as a common password authenticating operation); an operation of storing blank images in the image storing unit 1060 in place of all the original images having restrictions imposed on the outputs thereof, without a password authentication (hereinafter referred to simply as a common blank image storing operation); an operation of storing form images in the image storing unit 1060 in place of all the original images having restrictions on the outputs thereof (hereinafter referred to simply as a common form image storing operation); an operation of not storing all the original images having restrictions thereon (hereinafter referred to simply as a common skipping operation); and an operation of acquiring an individual selected operation every time an original image having a restriction on the output thereof is detected (hereinafter referred to simply as an individual selection acquiring operation).

If the control unit 1100 determines that a common selected operation has already been acquired, the control unit 1100 carries out the procedure of step ST508. If not, the control unit 1100 carries out the procedure of step ST502.

If the control unit 1100 determines that a common selected operation has not been acquired in step ST501, the control unit 1100 controls the display unit 1120 to display a common operation select screen (step ST502). The common operation select screen is a screen that shows a common selected operation that can be input by the user operating the input units 1110.

The control unit 1100 then acquires a common selected operation that is input through the input units 1110 (step ST503). The control unit 1100 then determines whether the common selected operation acquired in step ST503 is a common password authenticating operation (step ST504). If the acquired common selected operation is determined to be a common password authenticating operation, the control unit 1100 carries out the procedure of step ST505.

If the common selected operation is determined to be a common password authenticating operation in step ST504, the control unit 1100 displays a password screen (step ST505). The password screen is a screen that shows a password that is input by the user operating the input units 1110.

The control unit 1100 then obtains a password that is input by the user operating the input units 1110 (step ST506). The control unit 1100 then determines whether the authentication conditions are satisfied by the password obtained in step ST506 (step ST507). If the password is determined to satisfy the authentication conditions, the control unit 1100 carries out the procedure of step ST501. If the password is determined not to satisfy the authentication conditions, the control unit 1100 returns to step ST502, and repeats the above-described procedures.

The operation of determining whether the password is authenticated is the same as the procedure of step ST109, and therefore, explanation of the operation is omitted here.

If the control unit 1100 determines that a common selected operation has already been acquired in step ST501, the control unit 1100 determines whether the common selected operation is an individual selection acquiring operation. If the common selected operation is determined to be an individual selection acquiring operation in step ST501, the control unit 1100 carries out an individual selection acquiring operation. If the common selected operation is determined not to be an individual selection acquiring operation, the control unit 1100 carries out the procedure of step ST514.

If the common selected operation is determined to be an individual selection acquiring operation in step ST508, the procedures of steps ST509 through ST513 are carried out (steps ST509 through ST513). Since the procedures of steps ST509 through ST513 are the same as the procedures of steps ST301 through ST305, explanation of them is omitted here.

If the individual selected operation is determined not to be a password authenticating operation in step ST511, or if the password is determined to be authenticated in step ST513, the control unit 1100 ends the individual selection acquiring operation.

If the common selected operation is determined not to be an individual selection acquiring operation in step ST508, the common selected operation is set as an individual selected operation (step ST514). The control unit 1100 then ends the individual selection acquiring operation.

To sum up, if the common selected operation is a common password authenticating operation, the individual selected operation is a password authenticating operation. If the common selected operation is a common blank image storing operation, the individual selected operation is a blank image storing operation. If the common selected operation is a common form image storing operation, the individual selected operation is a form image storing operation. If the common elected operation is a common skipping operation, the individual selected operation is a skipping operation.

Figure 18:
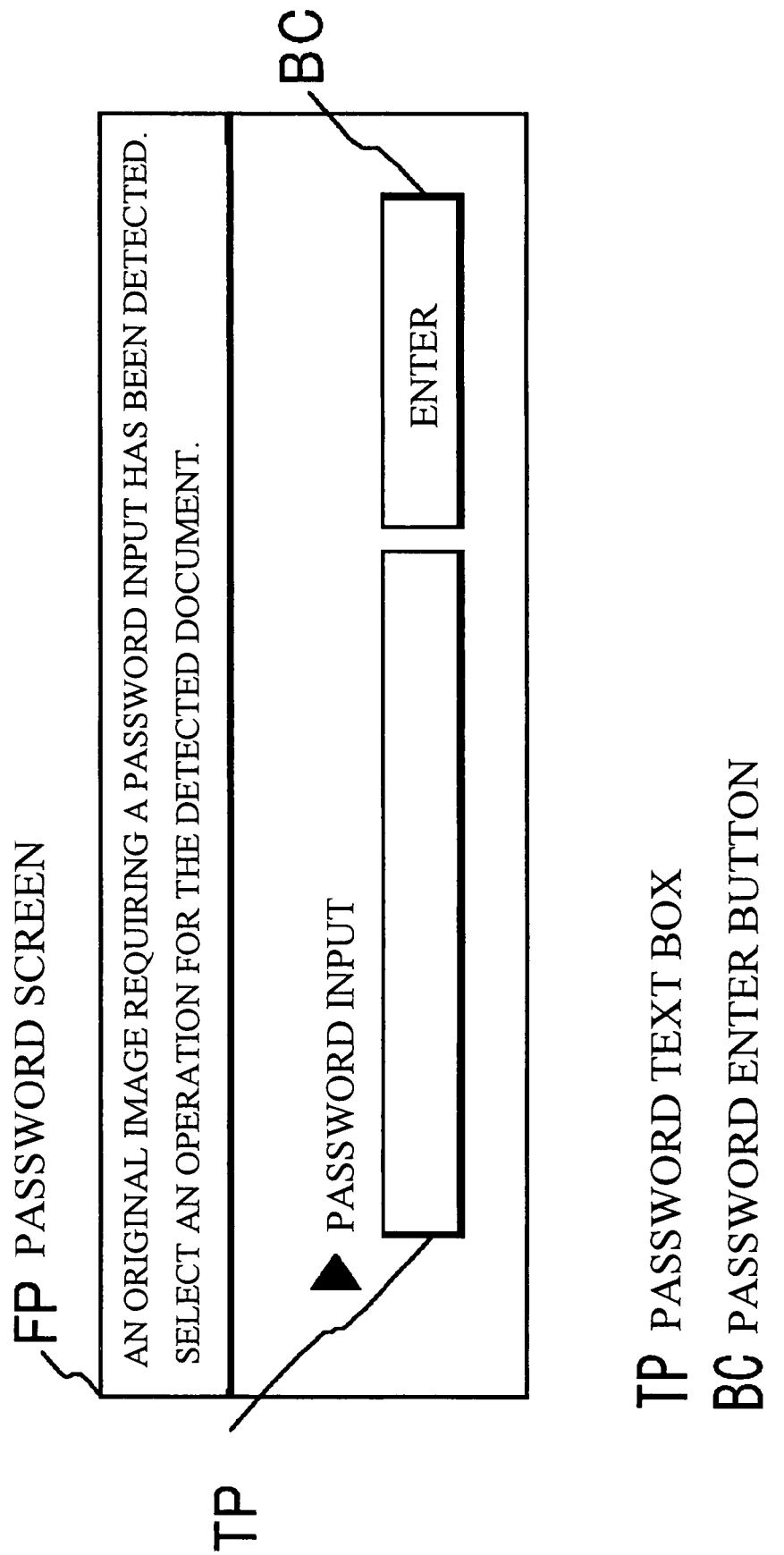
FIG. 18 shows an example of a password screen.

Referring now to FIG. 18, the password screen to be displayed by the display units 1120 in step ST106 is described. FIG. 18 shows an example of the password screen.

The password screen FP shown in FIG. 18 has a password text box TP and a password enter button BC.

The password text box TP and the password enter button BC of the password screen FP have the same display functions as the password text box TP and the password enter button BC of the individual operation select screen FI. Therefore, explanation of them is omitted here.

Figure 19A:
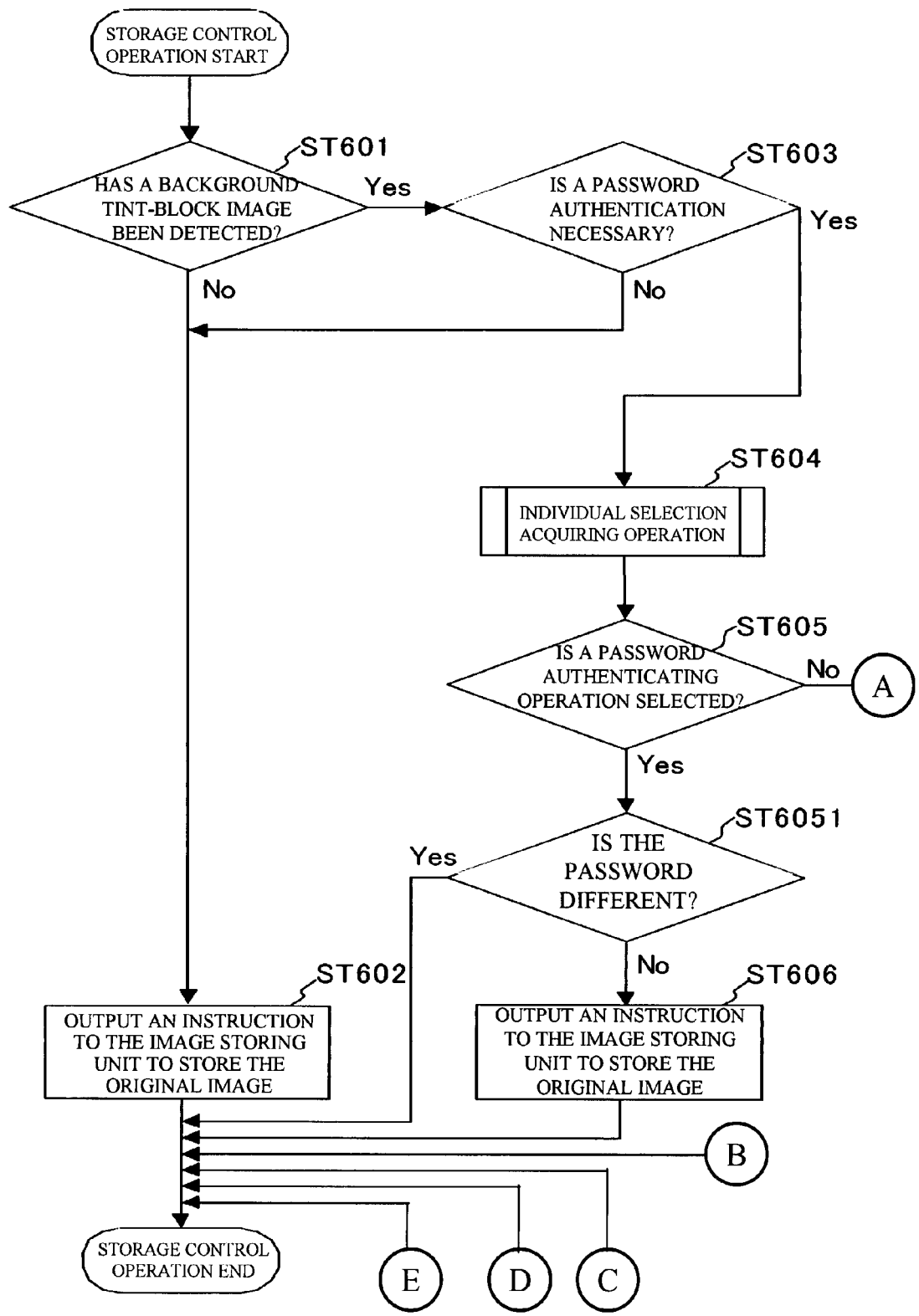
FIG. 19A and FIG. 19B are a flowchart showing an example of a storage control operation to be performed by the control unit in the second exemplary embodiment.
Figure 19B:
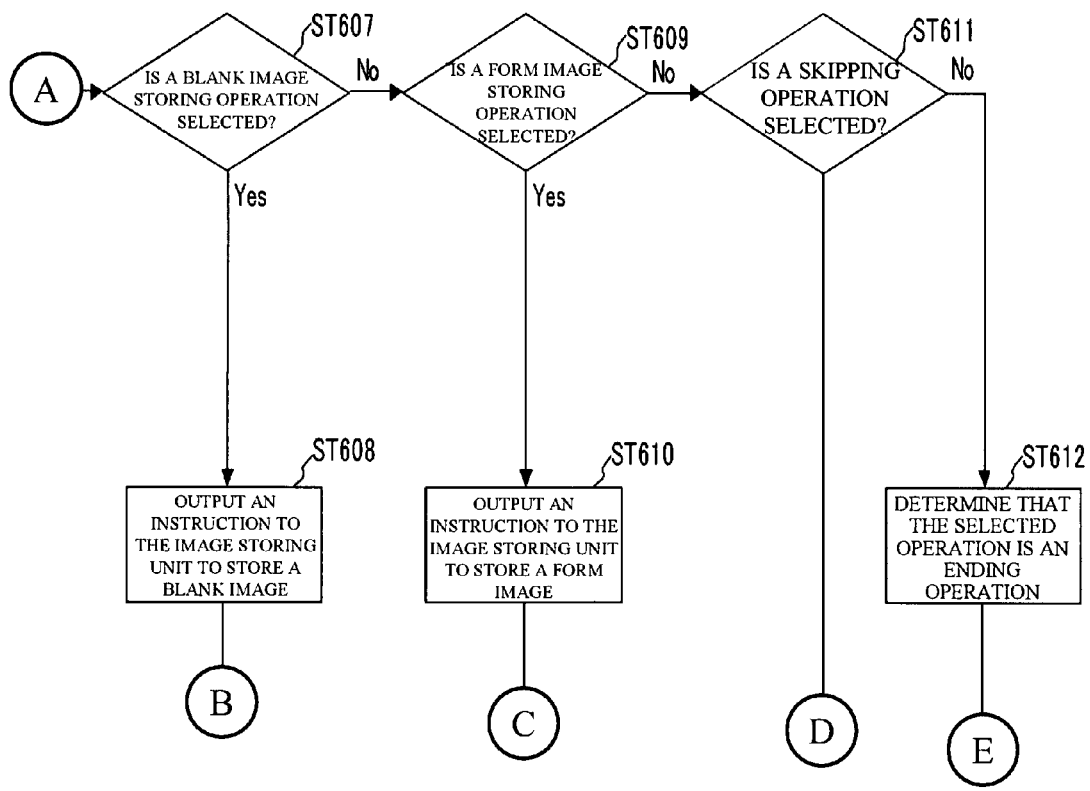

Referring now to FIG. 19A and FIG. 19B, a storage control operation in accordance with the second exemplary embodiment is described. FIG. 19A and FIG. 19B are a flowchart showing an example of the storage control operation to be performed by the control unit 1100.

The control unit 1100 carries out the procedures of steps ST601 through ST612. The procedures of steps ST601 through ST603, ST605, and ST606 through ST612 are the same as the procedures of steps ST201, through ST203, ST205, and ST206 through 212. Therefore, explanation of them is omitted here.

Also, the individual selection acquiring operation to be performed by the control unit 1100 in step ST604 is the same as the individual selection acquiring operation shown in FIG. 17A and FIG. 17B. Therefore, explanation of the individual selection acquiring operation is omitted here.

Here, the procedure of step S6051 is described. If the individual selected operation is determined to be a password authenticating operation in step ST605, the control unit 1100 determines whether a password authenticated based on the control information is different from the password obtained in step ST506 of the individual selection acquiring operation (step ST6051). If the passwords are determined to be different from each other, the control unit 1100 does not control the image storing unit 1060 to store the original image, and ends the storage control operation. If the passwords are determined not to be different from each other, the control unit 1100 carries out the procedure of step ST506.

As described above, if the password authenticated based on the control information is determined to be different from the password obtained in step ST506 of the individual selection acquiring operation in step ST6051, the control unit 1100 does not control the image storing unit 1060 to store the original image and a control image, and ends the storage control operation. However, the present invention is not limited to that arrangement.

For example, the control unit 1100 may again control the display units 1120 to display the password screen FP shown in FIG. 18, and then compare a password input through the input units 1110 with a password authenticated based on the control information. If the two passwords are the same, the control unit 1100 controls the image storing unit 1060 to store the original image. If the two passwords are different from each other, the control unit 1100 repeats the above-described procedures.

Alternatively, the control unit 1100 may return to step ST604, and again perform the individual selection acquiring operation, for example.

Further, the control unit 1100 may control the image storing unit 1060 to store a blank image or a form image in place of the original image, for example.

Figure 20:
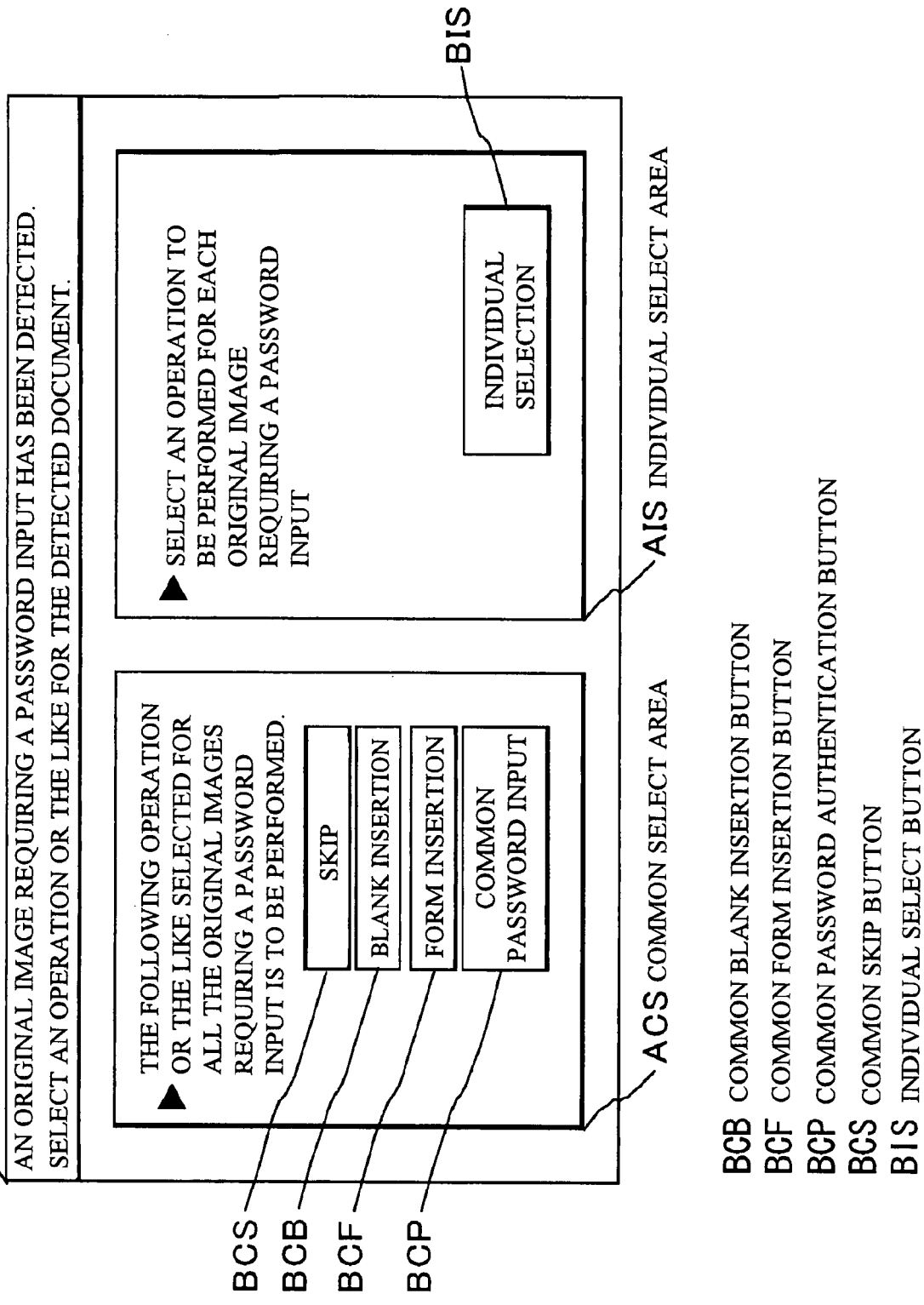
FIG. 20 shows an example of a common operation select screen to be displayed by the display unit.

Referring now to FIG. 20, the common operation select screen FC is described. FIG. 20 shows an example of the common operation select screen FC to be displayed by the display unit 1120.

The common operation select screen FC is formed with a common blank sheet insertion button BCB, a common form insertion button BCF, a common skip button BCS, a common password authentication button BCP, and an individual select button BIS.

The common blank sheet insertion button BCB, the common form insertion button BCF, the common skip button BCS, the common password authentication button BCP, and the individual select button BIS are display buttons through which signals can be exclusively input by operating the input unit 1110 so as to select a common blank sheet insertion operation, a common form image storing operation, a common skipping operation, a common password authenticating operation, and an individual selection acquiring operation as common selected operations.

As described above, restriction images are blank images in this exemplary embodiment. However, the present invention is not limited to that arrangement. For example, black images may be employed.

Third Exemplary Embodiment

Next, a third exemplary embodiment of the present invention is described.

In an image processing device in accordance with the third exemplary embodiment, an original image having restrictions on outputs thereof is combined with a restriction image that is a black image, so that the information shown on the original image can be concealed when the original image is output.

An image processing device in accordance with the third exemplary embodiment has substantially the same structure and functions as the image processing device 1000 of the first exemplary embodiment. Therefore, the aspects that are different from the first exemplary embodiment are described below.

Figure 21:
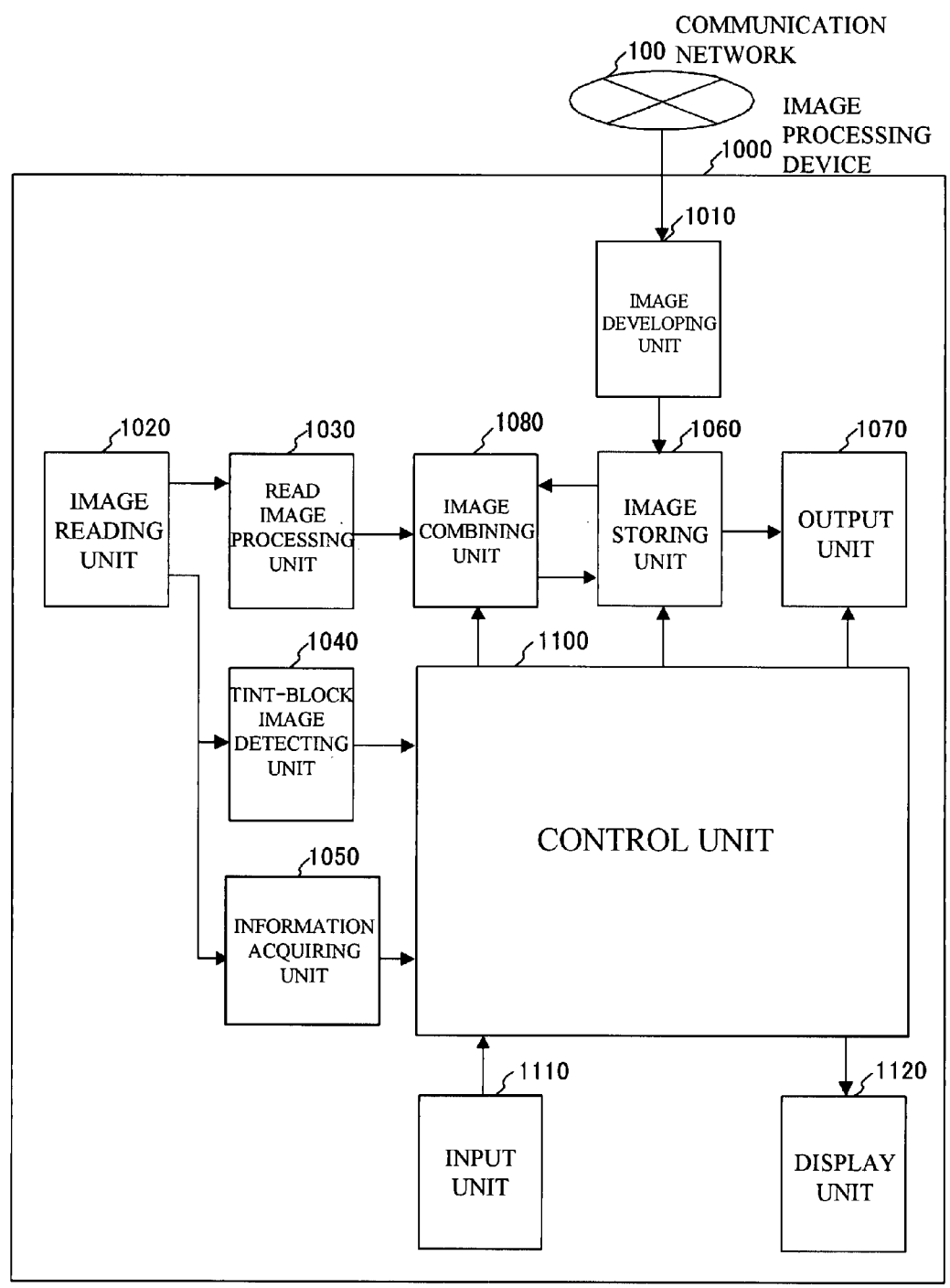
FIG. 21 is a functional block diagram of an image processing device in accordance with a third exemplary embodiment of the present invention.

Referring now to FIG. 21, an image processing device in accordance with the third exemplary embodiment is described. FIG. 21 illustrates an image processing device in accordance with the third exemplary embodiment.

The image processing device 1000 shown in FIG. 21 differs from the image processing device 1000 of the first exemplary embodiment in further including an image combining unit 1080.

Unlike the read image processing unit 1030 of the first exemplary embodiment, the read image processing unit 1030 of this exemplary embodiment is connected to the image combining unit 1080, instead of the image storing unit 1060. The read image processing unit 1030 of this exemplary embodiment outputs each processed image to the image combining unit 1080, instead of the image storing unit 1060.

The image combining unit 1080 is connected to the read image processing unit 1030, the image storing unit 1060, and the control unit 1100. The image combining unit 1080 combines an original image read by the read image processing unit 1030 with a restriction image stored in the image storing unit 1060 in accordance with an instruction from the control unit 1100, and outputs the combined images to the image storing unit 1060. Alternatively, the image combining unit 1080 outputs the original image to the image storing unit 1060, without combining the original image with the restriction image.

Here, restriction images in the third exemplary embodiment are the same as the restriction images of the first exemplary embodiment. However, the restriction images differ from the restriction images of the first exemplary embodiment in being images that can conceal at least the information represented by combined original images.

More specifically, in a case where the image processing device 1000 outputs a black and white image, a black image (or a blank image) in which almost all the pixels are black pixels (or white pixels) is contained in restriction images. Accordingly, the characters, figures, or symbols formed by black pixels (or white pixels) in an original image can be made invisible by combining a black image (or a blank image) with the original image.

In another specific example case, a form image that includes characters, figures, or symbols, such as "copy prohibited" indicating that outputs of an original image are restricted, is contained in restriction images. Accordingly, the characters, figures, or symbols in an original image can be partially or entirely concealed by combining such a form image with the original image.

Unlike the image storing unit 1060 of the first exemplary embodiment, the image storing unit 1060 of this exemplary embodiment is connected to the image combining unit 1080, instead of the read image processing unit 1030. The image combining unit 1080 refers to the restriction images stored in the memory unit of the image storing unit 1060 of this exemplary embodiment.

The image storing unit 1060 of this exemplary embodiment obtains an original image or a restriction image combined with an original image from the image developing unit 1010 and the image combining unit 1080. Under the control of the control unit 1100, the image storing unit 1060 then stores the obtained image in the memory unit of the image storing unit 1060.

Figure 22A:
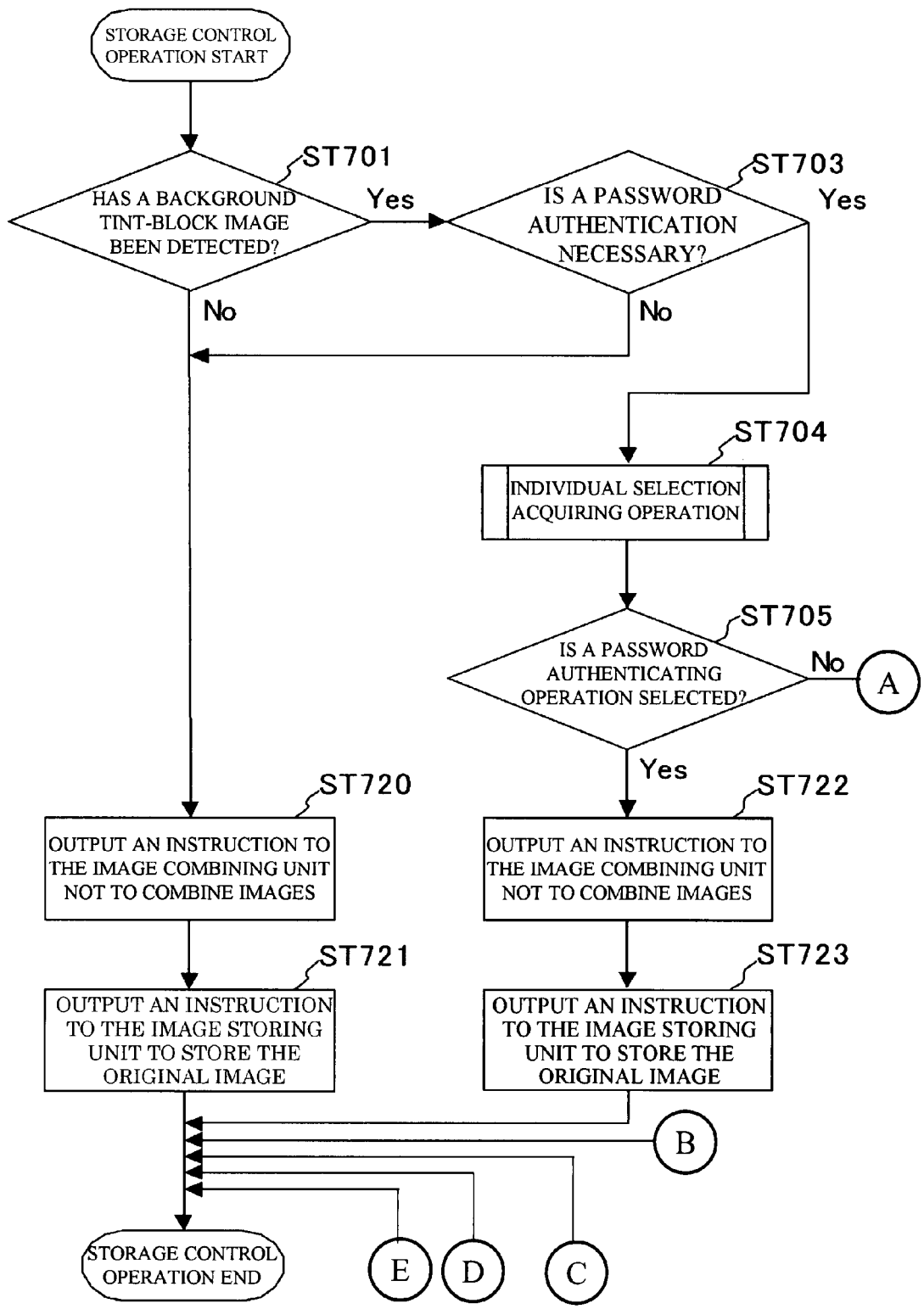
FIG. 22A and FIG. 22B are a flowchart showing an example of a storage control operation to be performed by the control unit in the third exemplary embodiment.
Figure 22B:
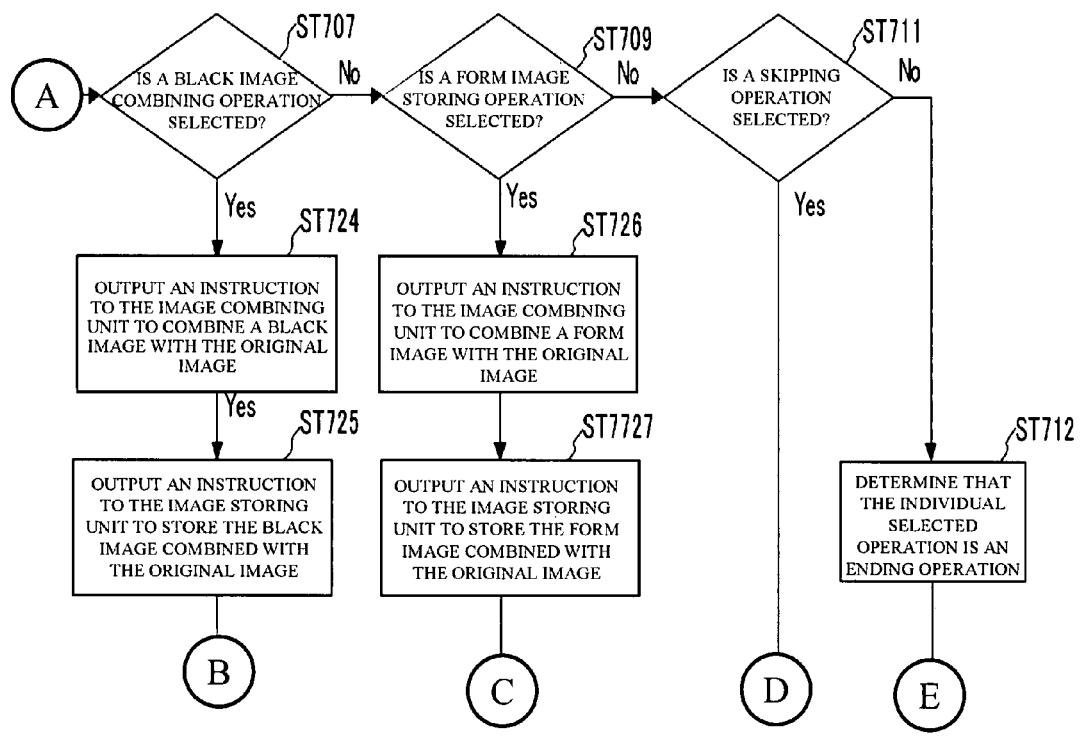

Unlike the control unit 1100 of the first exemplary embodiment, the control unit 1100 of this exemplary embodiment is connected to the image combining unit 1080. Referring now to FIG. 22A and FIG. 22B, the procedures that are to be carried out by the control unit 1100 and differ from the procedures of the first exemplary embodiment are described. FIG. 22A and FIG. 22B are a flowchart showing an example of a storage control operation to be performed by the control unit 1100 of this exemplary embodiment.

First, the control unit 1100 determines whether a background tint-block image has been detected from the subject original image (step ST701). Since the procedure of step ST701 is the same as the procedure of step ST201, explanation of it is omitted here. If the control unit 1100 determines that a background tint-block image has been detected from the original image, the control unit 1100 carries out the procedure of step ST703. If the control unit 1100 determines that a background tint-block image has not been detected from the original image, the control unit 1100 carries out the procedure of step ST720.

If the control unit 1100 determines that a background tint-block image has been detected from the original image in step ST701, the control unit 1100 determines whether a password authentication is necessary (step ST703). Since the procedure of step ST703 is the same as the procedure of step ST203, explanation of it is omitted here.

If a password authentication is necessary, the control unit 1100 carries out the procedure of step ST704. If not, the control unit 1100 carries out the procedure of step ST720.

If the control unit 1100 determines that a password authentication is necessary in step ST703, the control unit 1100 carries out the procedures of steps ST704 and ST705. Since the procedures of steps ST704 and ST705 are the same as the procedures of steps ST204 and ST205 shown in FIG. 12A, explanation of them is omitted here.

In the third exemplary embodiment, the individual selected operations include: a password authenticating operation; an operation of combining an original image having restrictions on the outputs thereof with a black image, and storing the combined images in the image storing unit 1060, without a password authentication (hereinafter referred to simply as a black image combining operation); an operation of combining an original image having restrictions thereon with a form image, and storing the combined images in the image storing unit 1060 (hereinafter referred to simply as a form image combining operation); a skipping operation; and an ending operation.

If the control unit 1100 determines that a background tint-block image has not been detected from the original image in step ST701, or if the control unit 1100 determines that a password authentication is not necessary in step ST703, the control unit 1100 outputs an instruction to the image combining unit 1080 not to combine the original image with a restriction image (step ST720). The control unit 1100 then outputs an instruction to the image storing unit 1060 to store the original image not combined with a restriction image (step ST721). The control unit 1100 then ends the storage control operation.

If the individual selected operation is determined to be a password authenticating operation in step ST705, the control unit 1100 carries out the procedures of steps ST722 and ST723, and then ends the storage control operation. Since the procedures of steps ST722 and ST723 are the same as the procedures of steps ST720 and ST721, explanation of them is omitted here.

If the individual selected operation is determined not to be a password authenticating operation in step ST705, the control unit 1100 determines whether the individual selected operation is a black image combining operation (step ST707). If the individual selected operation is determined to be a black image combining operation, the control unit 1100 carries out the procedure of step ST724. If the individual selected operation is determined not to be a black image combining operation, the control unit 1100 carries out the procedure of step ST709.

If the individual selected operation is determined to be a black image combining operation in step ST707, the control unit 1100 outputs an instruction to the image combining unit 1080 to combine the original image with a black image (step ST724). The control unit 1100 next outputs an instruction to the image storing unit 1060 to store a restriction image that is the black image combined with the original image (step ST725). The control unit 1100 then ends the storage control operation.

If the individual selected operation is determined not to be a black image combining operation in step ST707, the control unit 1100 determines whether the individual selected operation is a form image combining operation (step ST709). If the individual selected operation is determined to be a form image combining operation, the control unit 1100 carries out the procedure of step ST726. If the individual selected operation is determined not to be a form image combining operation, the control unit 1100 carries out the procedure of step ST711.

If the individual selected operation is determined to be a form image combining operation in step ST709, the control unit 1100 outputs an instruction to the image combining unit 1080 to combine the original image with a form image (step ST726). The control unit 1100 next outputs an instruction to the image storing unit 1060 to store a restriction image that is the form image combined with the original image (step ST727). The control unit 1100 then ends the storage control operation.

If the individual selected operation is determined not to be a form image combining operation in step ST709, the control unit 1100 carries out the procedures of steps ST711 and ST712, and then ends the storage control operation. Since the procedures of steps ST711 and ST712 are the same as the procedures of steps ST211 and ST212, explanation of them is omitted here.

Figure 23:
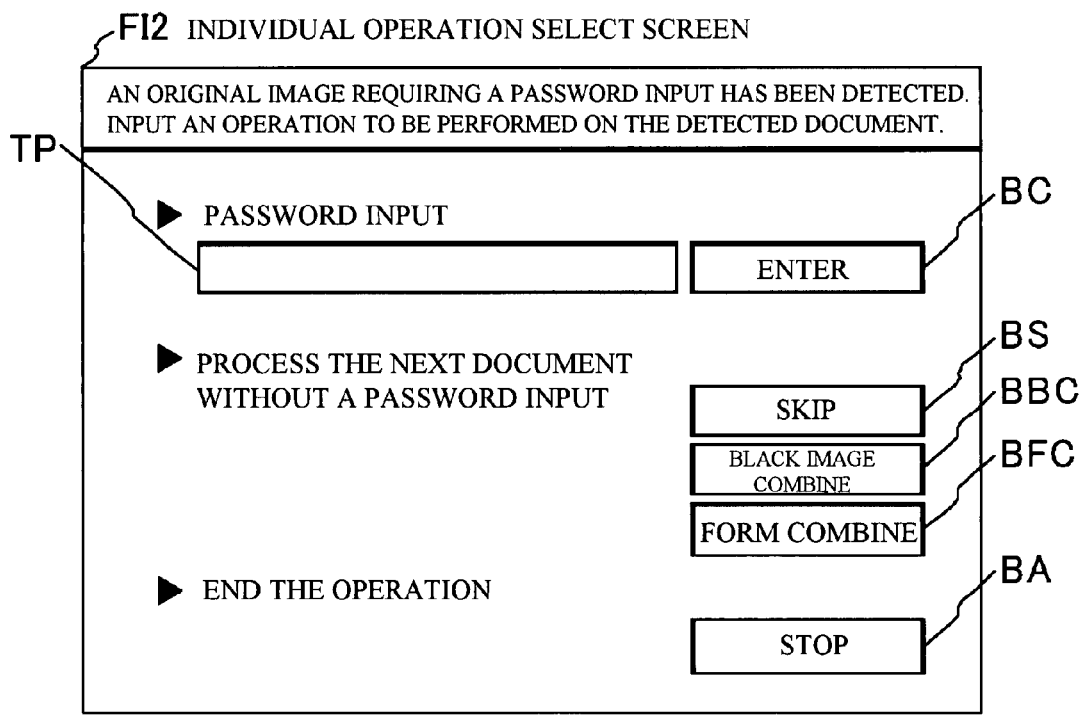
FIG. 23 shows an example of an individual operation select screen to be displayed by the display unit in the third exemplary embodiment.

Referring now to FIG. 23, an individual operation select screen to be displayed by the display units 1120 in the third exemplary embodiment is described. FIG. 23 shows an example of an individual operation select screen to be displayed by the display units 1120.

The individual operation select screen FI2 is formed with a password text box TP, a password enter button BC, a black image combine button BBC, a form combine button BFC, a skip button BS, and an end button BA.

The password text box TP and the password enter button BC of the individual operation select screen FI2 are the same as the password text box TP and the password enter button BC of the individual operation select screen FI of the first exemplary embodiment shown in FIG. 14. Therefore, explanation of them is omitted here.

The password enter button BC, the black image combine button BBC, the form combine button BFC, the skip button BS, and the end button BA are display buttons through which signals can be exclusively input by operating the input units 1110 so as to select a password authenticating operation, a black image combining operation, a form image combining operation, a skipping operation, and an ending operation that are individual selected operations.

The image processing device 1000 can be functionally realized by the operating unit 1001 executing a program stored in at least one of the ROM 1002, the RAM 1003, and the external memory unit 1004. The program may be distributed on magnetic disks, optical disks, semiconductor memories, and other recording media, or may be distributed via a network.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

In the above-described exemplary embodiments, each external memory device is a hard disk. However, the present invention is not limited to that arrangement. For example, the external memory devices may be flexible disks, CD-ROMs (Compact Disc Read Only Memories), DVD-ROMs (Digital Versatile Disk Read Only Memories), DVD-RAMs (Digital Versatile Disk Random Access Memories), MOs (magneto-optic disks), or flash memories.

Although restriction images are blank images in the above-described exemplary embodiments, the present invention is not limited to that arrangement. For example, images in one color other than white (blanks) may be employed.

Although the control images include background tint-block images in the above exemplary embodiments, the present invention is not limited to that arrangement. For example, the control images may include one-dimensional bar codes, QR codes that are two-dimensional codes, Code 49, Code 16K, PDF 417, or Maxicode.

Although the control unit 1100 restricts the outputs of original images on the basis of password authentication results in the above exemplary embodiments, the present invention is not limited to that arrangement. For example, the outputs of original images may be restricted based on the results of user authentications with the use of user information and passwords or the results of biometrics authentications with the use of finger prints, the iris, or voices.

In the above exemplary embodiments, the tint-block image detecting unit 1040 and the information acquiring unit 1050 are connected to the image reading unit 1020. However, the present invention is not limited to that arrangement. For example, the tint-block image detecting unit 1040 and the information acquiring unit 1050 may be connected to the image developing unit 1010, so that the tint-block image detecting unit 1040 and the information acquiring unit 1050 obtain a developed original image every time the image developing unit 1010 develops an original image, and output a notification of the existence of a control image and the control information represented by the control image to the control unit 1100.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with various modifications as are suited to the particular use contemplated. It is intended that the scope of the invention be defined by the following claims and their equivalents.

What is claimed is:

1. An image processing device comprising:
   a hardware processor that performs image processing configured to:

obtain original images one by one from an original document on which the image processing is to be performed;

output each of the original images obtained;

acquire control information including an authenticated password from the original image; and in response to the acquired control information from the original image, control a display portion to display a select screen for selecting one of: (1) a first process of acquiring the authenticated password from the original image; (2) a second process of outputting a restriction image indicating that the output of the original image is restricted, instead of the original image; or (3) a third process of skipping the output of the original image, wherein in response to the first process being selected, control the output portion to output the original image when the authenticated password and an input password inputted by a user are the same, in response to the second process being selected, control the output portion to output the restriction image, and in response to the third process being selected, control the output portion to skip the output of the original image.

2. The image processing device according to claim 1, wherein the hardware processor is further configured to:

combine the original image with the restriction image, wherein:

control to output the restriction image combined with the original image, instead of the original image, when the second process is selected; and the restriction image is an image that conceals information represented by the original image combined with the restriction image.

3. The image processing device according to claim 1, wherein the restriction image includes an image that is stored beforehand in a memory unit.

4. The image processing device according to claim 1, wherein the restriction image includes a blank image or a black image.

5. The image processing device according to claim 1, the hardware processor is further configured to:

store the original images;

output an image;

control to store the restriction image instead of the original image when the second process is selected; and the restriction image is an image that is stored beforehand.

6. The image processing device according to claim 1, wherein the hardware processor is further configured to control to restrict all output operations for images, when all output images are the restriction images.

7. The image processing device according to claim 5, wherein the hardware processor is further configured to print out a plurality of images stored on one printing face of a printing medium; and control to restrict printing of all the images printed on the one printing face, when all the images printed on the one printing face are the restriction images.

8. The image processing device according to claim 5, wherein: the hardware processor is further configured to control to store the original image when the two passwords are the same.

9. The image processing device according to claim 1, wherein the control information includes request information for requesting a password authentication.

10. A non-transitory computer readable medium storing a program to execute a process for image processing, the process comprising:

obtaining original images one by one from an original document on which image processing is to be performed;

outputting each of the original images obtained;

acquiring control information including an authenticated password from the original image obtained; and controlling, in response to the acquired control information from the original image, a display portion to display a select screen for selecting one of: (1) a first process of acquiring the authenticated password from the original image; (2) a second process of outputting a restriction image indicating that the output of the original image is restricted, instead of the original image; or (3) a third process of skipping the output of the original image, wherein in response to the first process being selected, outputting the original image when the authenticated password and an input password inputted by a user are the same, in response to the second process being selected, outputting the restriction image, instead of the original image, and in response to the third process being selected, skipping the output of the original image.

11. The non-transitory computer readable medium according to claim 10, wherein the control information includes request information for requesting a password authentication.

12. An image processing method comprising:

obtaining original images one by one from an original document on which image processing is to be performed;

outputting each of the original images obtained;

acquiring control information including an authenticated password from the original image obtained; and controlling, in response to the acquired control information from the original image, a display portion to display a select screen for selecting one of: (1) a first process of acquiring the authenticated password from the original image; (2) a second process of outputting a restriction image indicating that the output of the original image is restricted, instead of the original image; or (3) a third process of skipping the output of the original image, wherein in response to the first process being selected, outputting the original image when the authenticated password and an input password inputted by a user are the same, in response to the second process being selected, outputting the restriction image, instead of the original image, in response to the third process being selected, skipping the output of the original image, and all the steps being performed by a hardware processor.

13. The image processing method according to claim 12, wherein the control information includes request information for requesting a password authentication.

* * * * *